US006976918B2

(12) United States Patent
Hosokawa

(10) Patent No.: US 6,976,918 B2
(45) Date of Patent: Dec. 20, 2005

(54) VIDEO GAME THAT INTERPOLATES BETWEEN ANIMATED SEGMENTS TO CREATE NEW SEGMENTS

(75) Inventor: Hirotaka Hosokawa, Osaka (JP)

(73) Assignee: Konami Corporation, Tokyo-to (JP)

( * ) Notice: Subject to any disclaimer, the term of this patent is extended or adjusted under 35 U.S.C. 154(b) by 0 days.

(21) Appl. No.: 09/767,458

(22) Filed: Jan. 23, 2001

(65) Prior Publication Data
US 2003/0045334 A1    Mar. 6, 2003

(30) Foreign Application Priority Data
Jan. 24, 2000 (JP) .............................. 2000-015103

(51) Int. Cl.[7] ................................................ A63F 9/22
(52) U.S. Cl. ....................................... 463/31; 345/473
(58) Field of Search ............................... 463/31, 71, 6; 345/473

(56) References Cited

U.S. PATENT DOCUMENTS

| | | | | |
|---|---|---|---|---|
| 3,809,395 A | * | 5/1974 | Allison et al. ................. | 463/2 |
| 5,261,041 A | * | 11/1993 | Susman ....................... | 345/473 |
| 5,411,272 A | * | 5/1995 | Naka et al. .................... | 463/33 |
| 5,816,920 A | * | 10/1998 | Hanai .......................... | 463/42 |
| 5,999,195 A | | 12/1999 | Santangeli | |
| 6,203,425 B1 | * | 3/2001 | Hayashi ....................... | 463/1 |
| 6,307,561 B1 | * | 10/2001 | Doi et al. ..................... | 345/473 |
| 6,414,685 B1 | * | 7/2002 | Takakura et al. .............. | 345/473 |
| 6,462,741 B1 | * | 10/2002 | Nishihata .................... | 345/473 |

FOREIGN PATENT DOCUMENTS

| | | |
|---|---|---|
| EP | 0428164 | 5/1991 |
| JP | 10-319957 | 12/1998 |
| JP | 2000-11199 | 1/2000 |
| JP | 2000057364 | 2/2000 |

OTHER PUBLICATIONS

Halas et al., The Technique of Film Animation, 1976. Focal Press Limited, pp. 189, 190, 218-222.*
Thomas et al., The Illusion of Life, Disney Animation, 1981, Walt Disney Productions, pp. 241, 317.*
Konami: "Track and Field" DLOV.COM 'Online! Retrieved from the Internet on Jun. 27, 2002, 2 pages.
Activision: "The Activision Decathlon" AtariAge, 'Online! Retrieved from the Internet on Jun. 27, 2002, 6 pgs.
EPYX: "Summer Games" Screenmania, 'Online! Retrieved from the Internet on Jun. 27, 2002, 4 pages.

* cited by examiner

Primary Examiner—Jessica Harrison
Assistant Examiner—Corbett Coburn
(74) Attorney, Agent, or Firm—Jordan and Hamburg LLP

(57) ABSTRACT

A video game device is provided with a recording medium 122 storing a first image data group including a plurality of frames of image data for displaying a running action and a second image data group including a plurality of frames of image data for displaying a goal finishing action which successively follows the running action; a character display control unit 201e for reading the first and second image data group from the recording medium 122 and displaying motions of a play character based on the read image data, and a switch control unit 201h for switching the first image data group to the second image data group such that the running action and the goal finishing action are successively displayed without any discontinuity when the play character reaches a predetermined position by repeatedly displaying the running action. With such a video game device, an increase in production costs can be effectively suppressed, and a game player is prevented from having a feeling of incongruity while viewing displayed images.

34 Claims, 27 Drawing Sheets

$\Delta V = d_{15.3} - d_{15}$

VIDEO GAME THAT INTERPOLATES BETWEEN ANIMATED SEGMENTS TO CREATE NEW SEGMENTS

The present invention relates to a video game device using an optical disk, a magnetic disk, a semiconductor memory or a cassette-type recording medium storing program data, a character action setting method in a video game and a computer-readable recording medium storing a character action setting program.

BACKGROUND OF THE INVENTION AND RELATED ART STATEMENT

A huge number of video game systems have been proposed. These systems include, for example, systems comprised of a special device for home use and a television monitor and systems comprised of a special device for business use, a personal computer or a workstation, a display and a sound output device. Any one of these systems includes a controller used by a game player for operation, a recording medium storing game program data, a CPU for executing controls to generate images and sounds based on the game program data, a processor for generating images, a processor for generating sounds, a CRT or like monitor for displaying images, and a loudspeaker for outputting sounds. CD-ROMS, semiconductor memories, cassette-type recording mediums having a built-in semiconductor memory are frequently used as the above recording medium.

It may be considered to execute a running competition such as a 100M dash in a game space as one kind of the game executed by such a game system. Specifically, in this running competition game, a plurality of play characters may be caused to appear on a track displayed on a monitor, the play character(s) whose running action is controlled by game player(s) and the other play characters whose running action is automatically controlled may be caused to compete with each other, ranking may be determined based on an order in which they reach a goal. In such a case, a multitude of frames of image data may be prepared between a starting pint to a goal point, and the play characters may be caused to make a series of running actions by successively displaying images based on the image data on the monitor.

In the case that a series of running actions are made as above, even a action different from usual running action such as raising of both hands at a position immediately before the goal can be so displayed as to smoothly follow the preceding action without any discontinuity, thereby giving no feeling of congruity to the game player. However, a large memory capacity is required to prepare a multitude of image data for successively displaying images from the starting point to the goal point, and a long time is required for the development of a program, leading to an increases in production costs.

SUMMARY OF THE INVENTION

In view of the above situation, an object of the present invention is to provide a video game device which can effectively suppress an increase in production costs and execute a video game without causing a game player to have a feeling of incongruity upon viewing displayed images, a character action setting method in the video game and a computer-readable recording medium storing a character action setting program.

In order to fulfill the above object, according to the present invention, a video game device for displaying a play character on a game seen displayed on a monitor and moving the play character from a reference position to a predetermined position in a game space by operating an operation unit, comprising:

a storage unit for storing a first image data group including a plurality of frames of image data for displaying a first action relating to the moving action of the play character and a second image data group including a plurality of frames of image data for displaying a second action, a display control unit for reading the first and second image data group from the storage unit and displaying the action of the play character based on the read image data, and a switch control unit for switching the first image data group to the second image data group such that the first action and the second action are smoothly successively displayed without any discontinuity when the pray character reaches the predetermined position by repeatedly displaying the first action.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
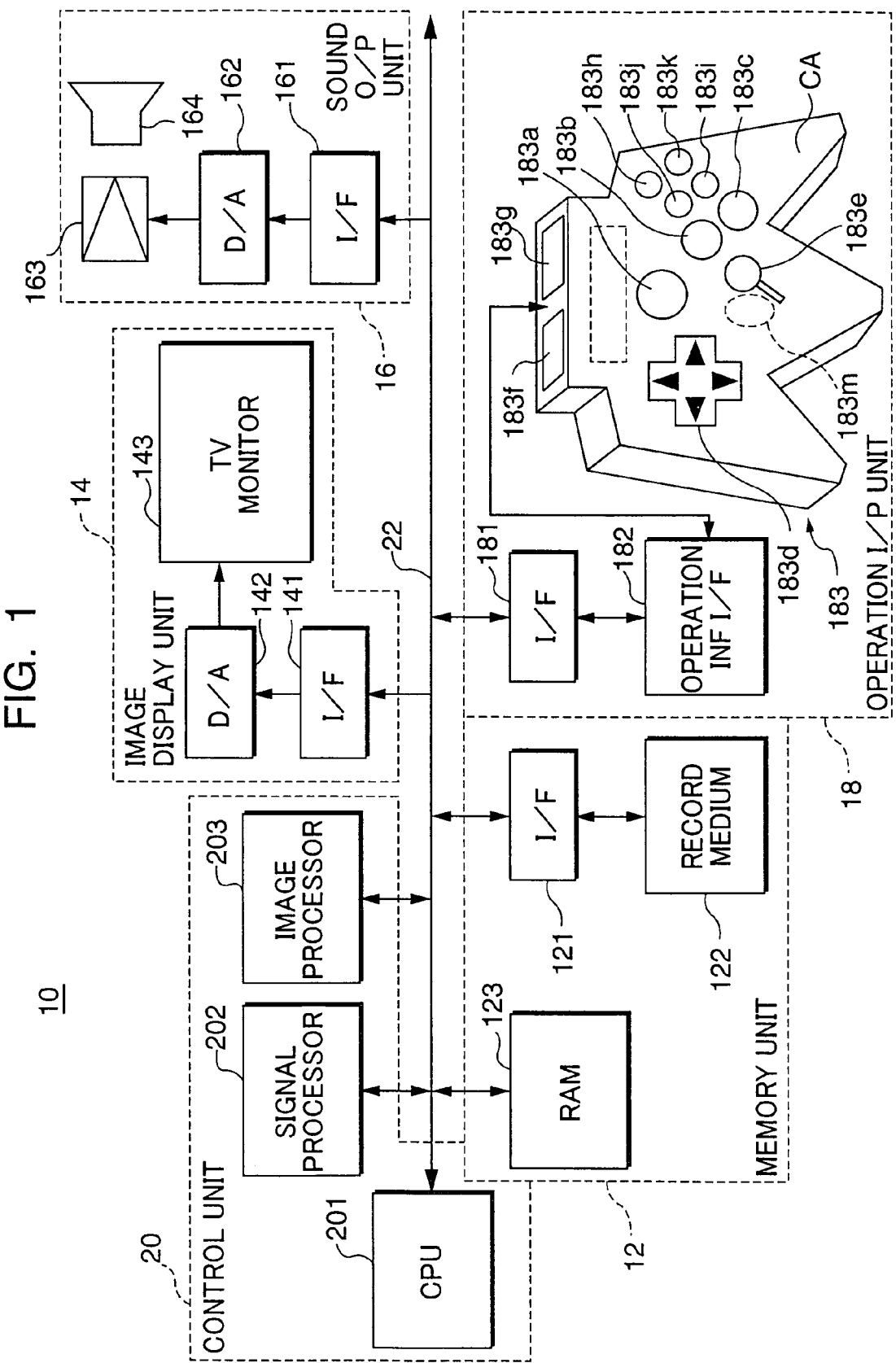
FIG. 1 is a construction diagram showing a video game system to which a character action setting method according to one embodiment of the present invention is applied.

FIG. 1 is a diagram showing the schematic construction of a video game system (video game device) 10 to which a character action setting method according to one embodiment of the present invention is applied. In FIG. 1, the video game system 10 is provided with a memory unit 12, an image display unit 14, a sound output unit 16, an operation input unit 18 and a control unit 20. The units 12, 14, 16 and 18 are connected with each other via a bus 22 including address buses, data buses and control buses connected with a CPU 201 of the control unit 20 to be described later.

In the memory unit 12 are stored game data comprised of image data, sound data and program data. The memory unit 12 includes a recording medium (also referred to as a recording medium) 122 connected with the bus 22 via an interface circuit 121 and a RAM 123 for temporarily storing the game data read from the recording medium 122. The recording medium 122 is, for example, a so-called ROM cassette in which a ROM or like recording medium storing game data and program data of an operating system is accommodated in a plastic casing, an optical disk, or a flexible disk.

The image display unit 14 is adapted to display various game images in accordance with the progress of the game and includes a digital-to-analog (D/A) Converter 142 connected with the bus 22 via an interface circuit 141 and a television monitor (video monitor) 143 including a CRT, a liquid crystal display or the like connected with the D/A converter 142.

The sound output device 16 is adapted to output a game music, sound effects, etc. in accordance with the progress of the game and is provided with a D/A converter 162 connected with the bus 22 via an interface circuit 161, an amplifying circuit 163 connected with the D/A converter 162, and a loudspeaker 164 for outputting sounds in accordance with an output signal from the amplifying circuit 163.

The operation input unit 18 is adapted to output operation signals to the control unit 20 and is provided with an operational information interface circuit 182 connected with a bus 22 via an interface circuit 181, and a controller 183 connected with the operational information interface circuit 182. The controller 183 includes a start button 183a, an A-button 183b, a B-button 183c, a cross-shaped key 183d, a stick-shaped controller 183e, a C1-button 183h, a C2-button 183i, a C3-button 183j and a C4-button 183k provided on the front surface of a casing CA, a left trigger button 183f and a right trigger button 183g provided on the upper surface of the casing CA, and a Z-button 183m provided on the rear surface of the casing CA.

The stick-shaped controller 183e has substantially the same construction as a joystick. Specifically, the controller 183e has a standing stick (operation bar), which can be inclined to front, back, left, right or in any direction in a 360° range about a specified point of the stick as a supporting point. According to the direction and angle of inclination of the stick, an X-coordinate along transverse direction and a Y-direction along forward/backward direction in coordinate systems having the standing position of the stick as an origin are sent to the control unit 20 via the interface circuits 182 and 182.

The control unit 20 is adapted to control the progress of the game, and is comprised of the CPU 201 connected with the bus 22, a signal processor 202 and an image processor 203. The signal processor 202 mainly performs calculation of image data in a three-dimensional (3D) space, calculation for transforming a position in the 3D space to a position in a simulated 3D space, a light source calculation, and generation and processing of sound data. The image processor 203 writes an image data to be displayed in the RAM 123 based on the calculation results in the signal processor 202. For example, the image processor 202 writes a texture data in an area of the RAM 123 specified by a polygon.

The video game system 10, thus constructed takes different modes according to its application. Specifically, in the case that the video game system 10 is constructed for business use, all the elements shown in FIG. 1 are, for example, contained in one casing. In the case that the video game system 10 is constructed for home use, the television monitor 143, the amplifying circuit 163 and the loudspeaker 164 are separate from a main game unit.

Here, the main game unit is, for example, comprised of the interface circuit 121 connected with the CPU 201, the RAM 123, the interface circuit 141, the D/A converter 142, the interface circuit 161, the D/A converter 162, the interface circuit 181, the operational information interface circuit 182, the controller 183, the signal processor 202 and the image processor 203. This main game unit is constructed by accommodating the respective elements in a casing made of a synthetic resin, and the recording medium 122 is detachably mounted in a mounting portion formed in this casing. The controller 183 is connected with a connector provided in the casing via a communication cable or the like.

In the case that the video game system 10 is constructed with a personal computer or a workstation as a core, for example, the television monitor 143 corresponds a computer display, the image processor 203 corresponds to part of the game program data stored in the recording medium 122 or hardware on an extension board mounted on an extension slot of the computer, and the interface circuits 121, 141, 161, 181, the D/A converters 142, 162, and the operational information interface circuit 182 correspond to hardware on the extension board mounted on the extension slot of the computer.

A case where the video game system 10 is constructed for home use is described below.

Next, the operation of the video game system 10 is summarily described. First, when an unillustrated power switch is turned on to activate the video game system 10, the CPU 201 reads image data, sound data and dame program data from the recording medium 122 in accordance with the operating system stored in the recording medium 122, and all or part of the read image data, sound data and same program data are stored in the RAM 123. Thereafter, a specified game is proceeded by the CPU 201 in accordance with the game program data stored in the RAM 123 and contents of instructions given by a game player via the controller 183.

Specifically, commands as tasks for forming images and outputting sounds are generated in accordance with contents of instructions given by a game player via the controller 183. The signal processor 202 performs calculation of display positions of characters in the 3D space (of course the same applies for a two-dimensional space), a light source calculation, generation and processing of sound data, etc. in accordance with these commands.

Data of images to be formed are written in the RAM 123 by the image processor 203 based on the calculation results. The image data written in the RAM 123 are fed to the D/A, converter 142 via the interface circuit 141, and fed to the television monitor 143 after being converted into analog video signals in the D/A converter 142, thereby being displayed as game images on a display surface of the television monitor 143.

On the other hand, the sound data outputted from the signal processor 202 are fed to the D/A converter 162 via the interface circuit 161 and outputted as sounds from the loudspeaker 164 via the amplifying circuit 163 after being converted into analog sound signals in the D/A converter 162.

Next, contents of the game executed in the video game system 10 are summarily described. In this video game system 10, one game can be selected from a plurality of competition gas by operating the start button 183a. Here, a 100M dash game which is a field and track game in which six play characters as runners compete a 100M dash on a track for competition.

In this embodiment, this 100M dash game is played by one to four game players; the running speeds of the number of the play characters corresponding to that of the game players are controlled by operation of the game players; the motions of the remaining play characters are controlled based on data set in advance and ranking is determined based on the order of reaching the finishing line.

The play character who comes in first raises his hands as a victory pose immediately before reaching the goal. In this occasion, the motion of the arms during running is smoothly successively transitioned to that of the victory position without causing the game play to have any feeling of incongruity.

Figure 2:
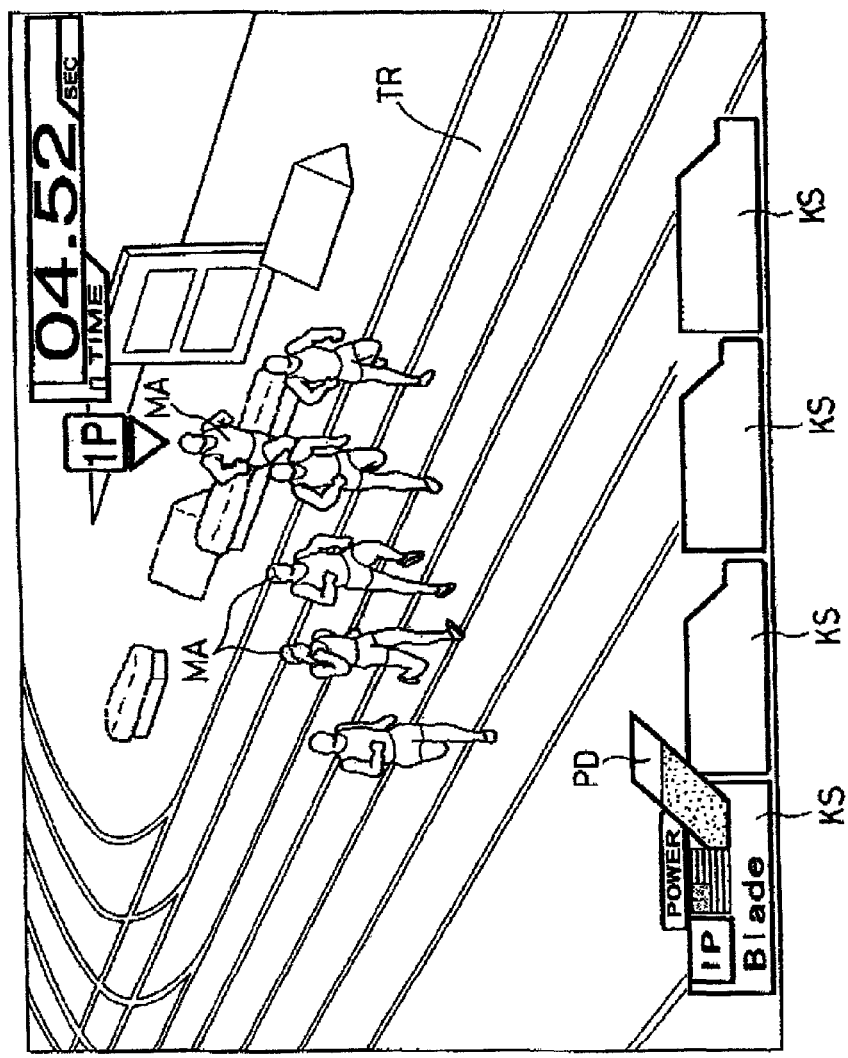
FIG. 2 is a diagram showing one game screen displayed in the video game system shown in FIG. 1, FIGS. 3 to 39 are diagrams showing a motion of a play character displayed on a game screen in the video game system shown in FIG. 1, respectively.

Next, a display example of a game screen when the 100M dash game is executed is described with reference to FIG. 2. The game screen shown in FIG. 2 is one screen at an intermediate stage of the actual 100M dash game. Specifically, in this game screen, six play characters MA running on the respective courses of a track TR are displayed in the middle, and runner columns KS for introducing the play characters MA operated by the game players are displayed at the bottom end of the game screen.

The runner columns KS are set in correspondence with four game players, and as many runner columns KS as the game participants are displayed. Here is shown a case where the game is played by one game player. "1P" representing the first play character MA and "national flag of the USA" representing the nation to which the play character MA belongs are displayed at the upper part of the runner column KS at the left end, and "Blade" as the name of the player character MA is displayed at the lower part.

The play character MA is generated as one animated model including all motions including those of a head, a trunk, legs and arms; its motions (poses) are displayed by giving an animation display timing; and movements of its position are displayed by giving a transport data. Here, the animated model is a model generated by polygons and displayed in the game space, and includes motion data (animation data) along a time axis. Specifically, by giving an arbitrary time (animation display timing) to the animated model, a motion in conformity with the animation display timing is displayed, and a series of animation is configured by successively increasing motions. The transport data is a relative position information of XYZ-coordinates given to the animated model. The animated model can be displayed in any arbitrary position of the game space by giving this transport data to the animated model.

A power display column (power meter) PD for displaying "running power" is so displayed as to extend obliquely upward to the right from the right end of the runner column KS. The "running power" is increased when the game player alternately and continuously turns on two operable members of the controller 183 such as the C1-button 183h and the C2-button 183i (continuous hitting). The higher the displayed level of the running power, the faster the play character MA can run.

The level of the running power is displayed by coloring the power display column PD in chromatic colors, and the colored area is increased as the level increases. The power display column PK is first colored in a cold color (e.g. blue), and the color tone changes toward a warm color (e.g. red) as the running power increases. In the already colored area as well, the color tone gradually changes toward a warm color. In FIG. 2, the level of the running power is displayed in dots.

Figure 3:
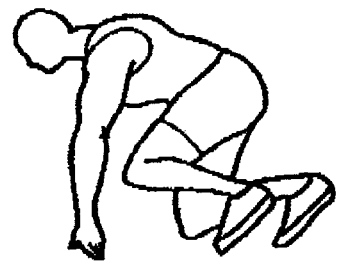

FIG. 3 is a diagram showing, an image of the play character MA posing a start on the game screen, in which both hands and the right knee are on the ground. FIGS. 4 to 20 are diagrams showing images of the running action of the play character MA on the game screen after a series of motions made to stand up from the starting pose. In other words, a looped running animation is shown in FIGS. 4 through 20. The looped animation is an animation which returns to the starting motion by resetting the animation display timing to 0 upon reaching the end. A smooth and continuous animation can be obtained by repeatedly reproducing the looped animation.

Figure 4:
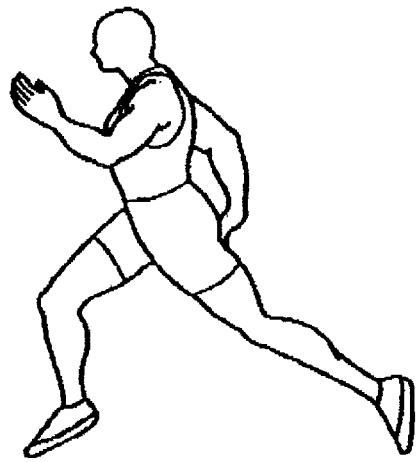
Figure 5:
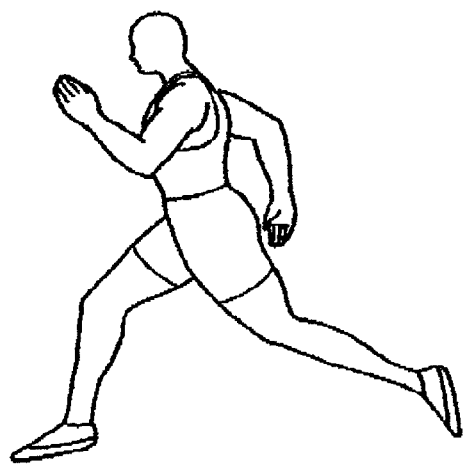

FIG. 4 shows a state where the right log is brought forward by kicking the ground by the left leg, the left arm is pushed upward to the front while being bent substantially at 90°, and the right arm is pulled back. FIG. 5 shows a state following the state of FIG. 4, where the right leg brought forward touches the ground, and the left arm is pushed further upward to the front.

Figure 6:
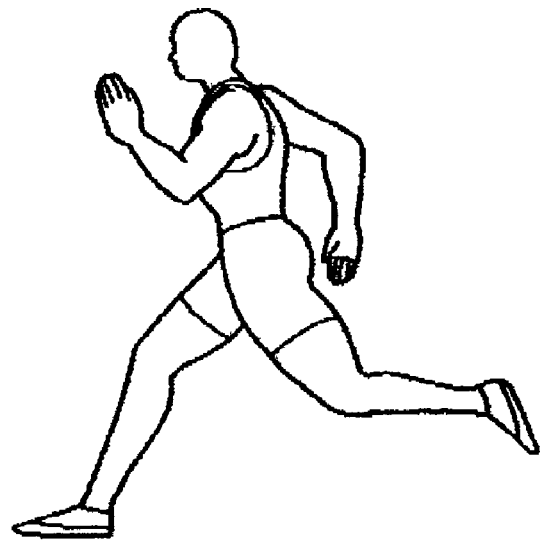
Figure 7:
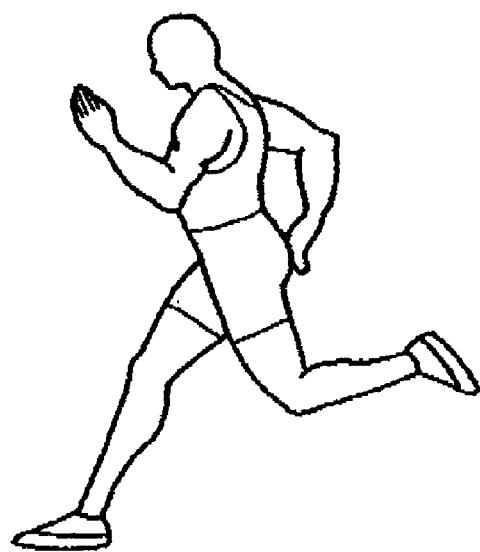
Figure 8:
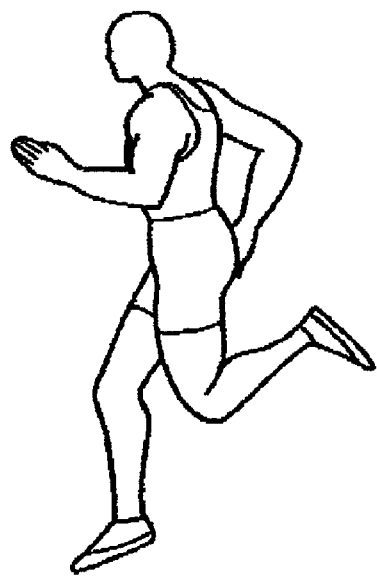
Figure 9:
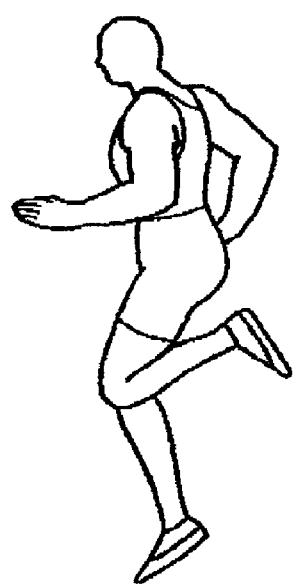
Figure 10:
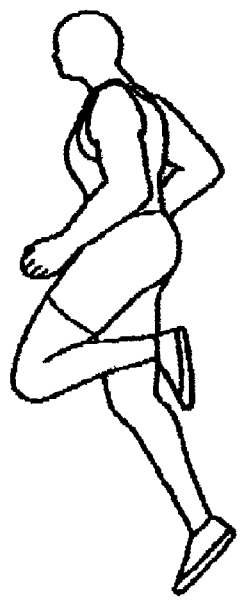
Figure 11:
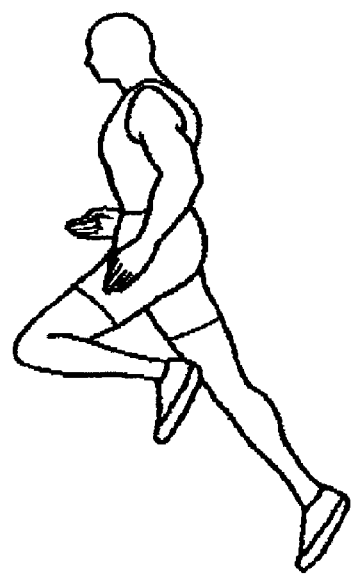

FIG. 6 shows a state following the state of FIG. 5, where the right leg brought forward touches the ground while substantially stretched out, and the left arm is pushed even further upward to the front. FIG. 7 shows a state following the state of FIG. 6; FIG. 8 shows a state following the state of FIG. 7; FIG. 9 shows a state following the state of FIG 8; FIG. 10 shows a state following the state of FIG. 9; FIG. 11 shows a state following the state of FIG. 10; and FIG. 12 shows a state following the state of FIG. 11.

Figure 12:
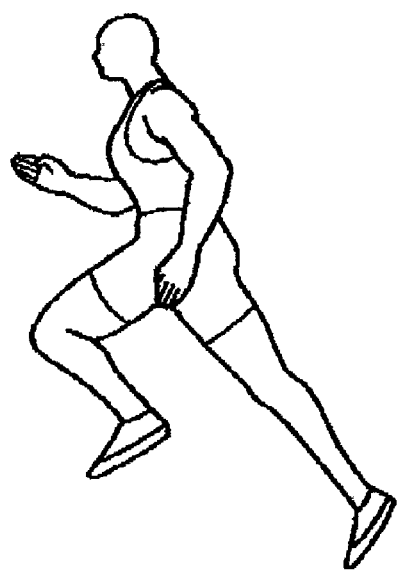
Figure 13:
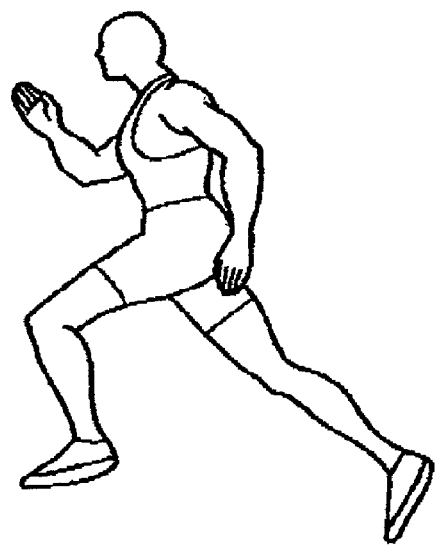
Figure 14:
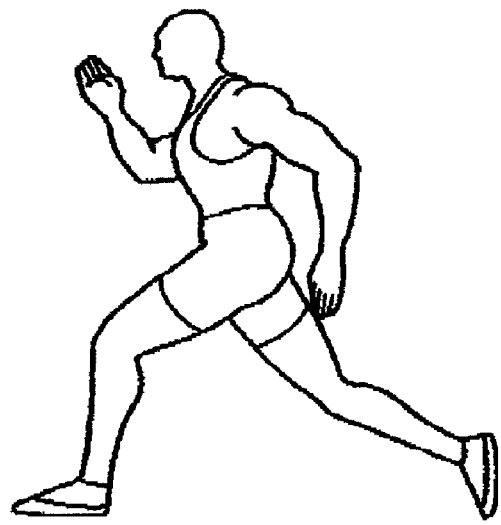
Figure 15:
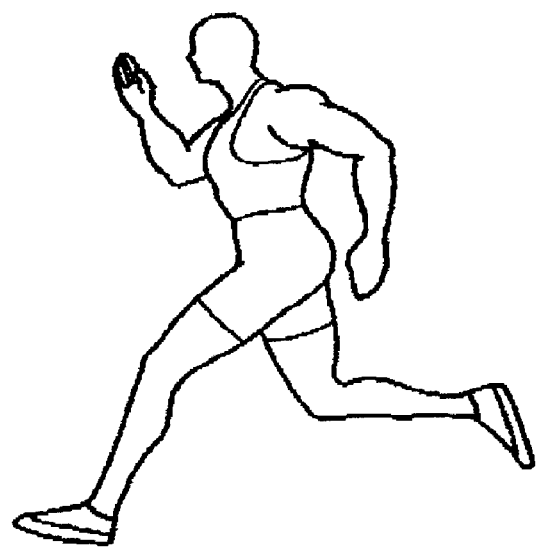
Figure 16:
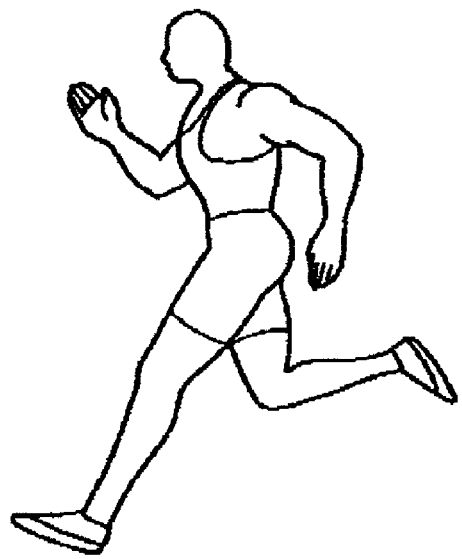

FIG. 13 shows a state following the state of FIG. 12. In FIG. 13, the left leg is bought forward while being bent by kicking the ground by the right leg, the left arm is pulled down to the back, and the right is pushed up forward while being bent substantially at 90°. FIG. 14 shows a state following the state of FIG. 13, where the left leg brought forward touches the ground, and the right arm is pushed further upward to the front. FIG. 15 shows a state following the state of FIG. 14, where the left leg brought forward touches the ground while substantially stretched out, and the right arm is pushed even further upward to the front. FIG. 16 shows a state following the state of FIG. 15, and FIG. 17 shows a state following the state of FIG. 16.

Figure 17:
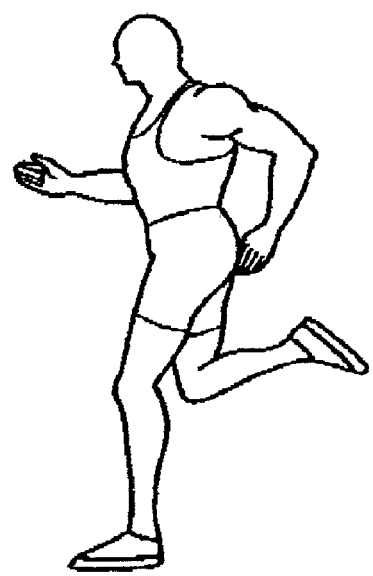
Figure 18:
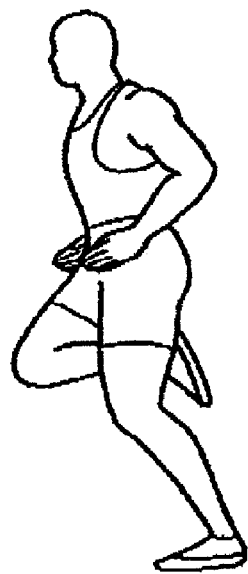
Figure 19:
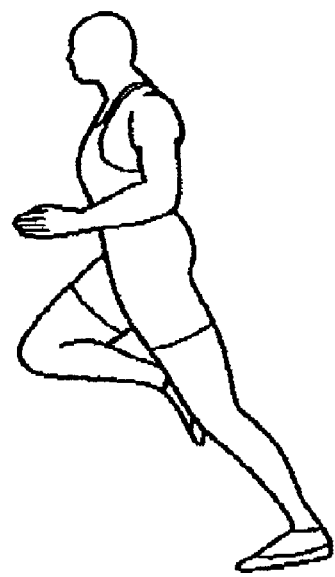
Figure 20:
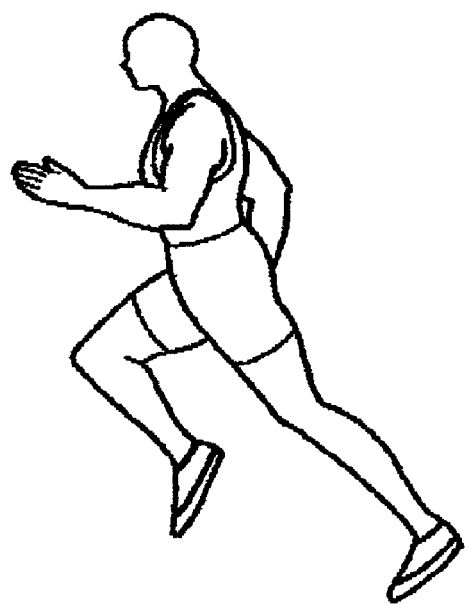

FIG. 18 shows a state following the state of FIG. 17, and FIG. 19 shows a state following the state of FIG. 18. FIG. 20 shows a state following the state of FIG. 19, where the left leg kicks the ground, the right leg brought forward is almost touching the ground, and the left arm is pushed forward while being bent substantially at 90°. A series of running motions can be displayed by returning to the state of FIG. 4 from the state of FIG. 20. In other words, a running action corresponding to an arbitrary distance can be displayed by repeatedly displaying a group of images (looped running animation) as one unit comprised of 17 frames of images. In this embodiment, a running distance (moved amount) of the play character MA reached when 17 frames of images are displayed once is set at a constant value regardless of the running speed.

Figure 21:
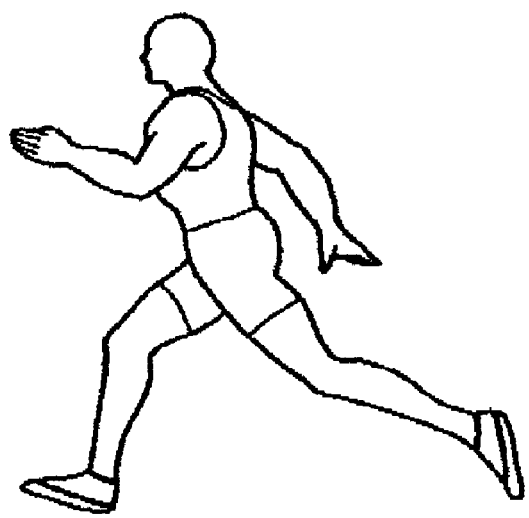
Figure 22:
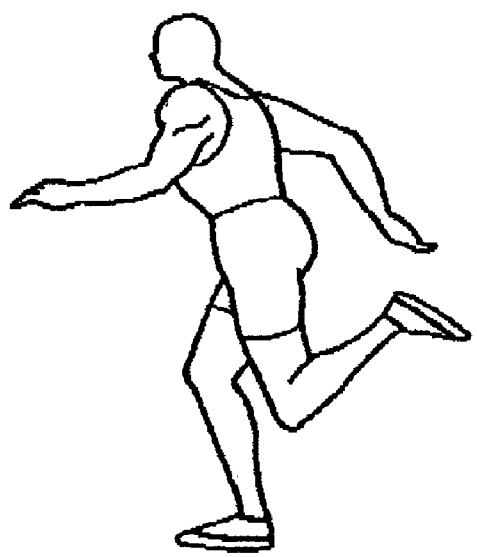

FIGS. 21 through 39 are diagrams showing a goal finishing action which follows the running action shown in FIGS. 4 through 20. For example, a series of motions for the goal finishing action are constituted by 19 frames of images. In other words, a goal finishing animation is constituted by images of FIGS. 21 through 39. FIG. 21 shows a state following the state of FIG. 4, where the right leg is almost touching the ground, and the raised left arm starts moving downward. FIG. 22 shows a state where the right leg touches the ground, the left arm is being moved downward, and the right arm is pulled back.

Figure 23:
Figure 24:
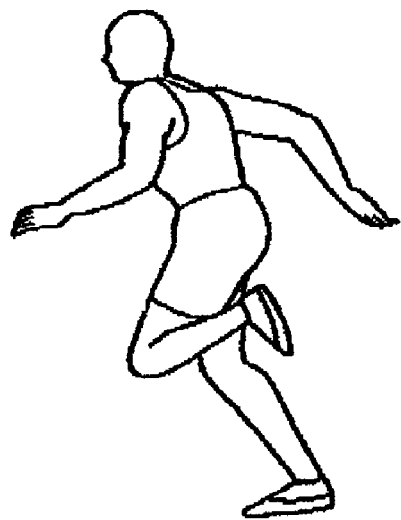
Figure 25:
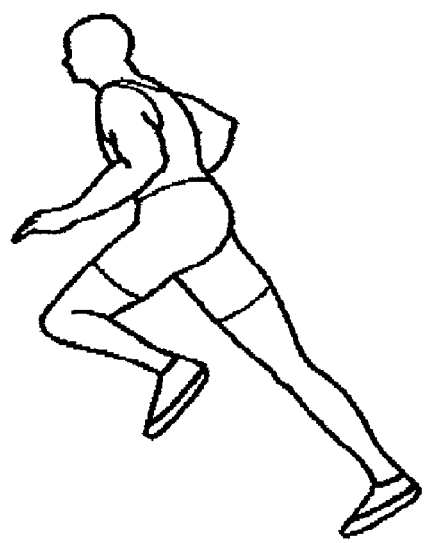
Figure 26:
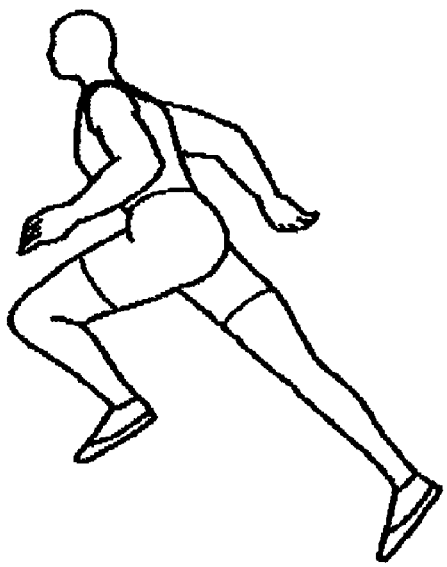
Figure 27:
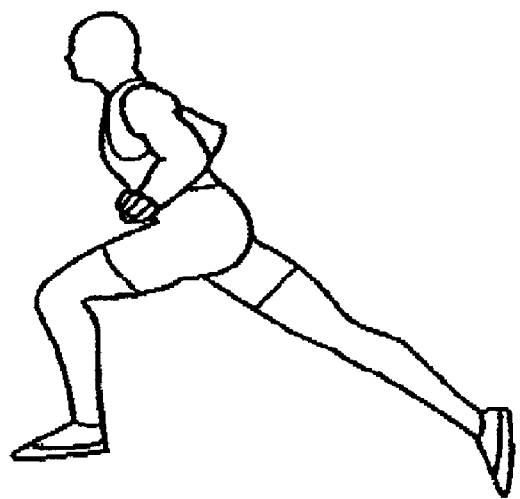
Figure 28:
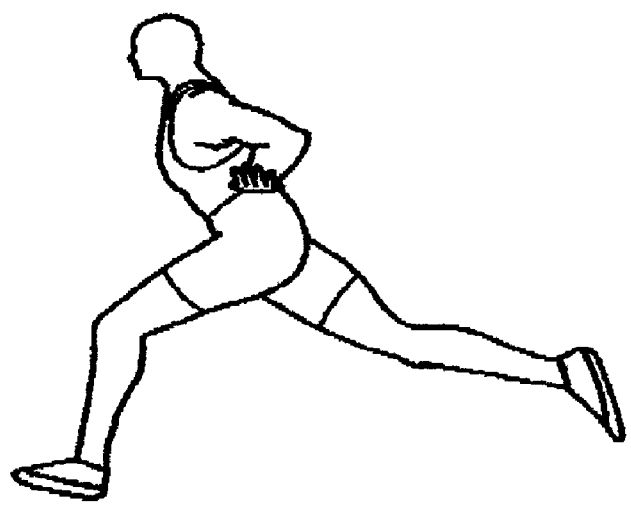

FIG. 23 shows a state following the state of FIG. 22; FIG. 24 shows a state following the state of FIG. 23; and FIG. 25 shows a state following the state of FIG. 24, where the right leg kicks the ground, the left arm is pushed slightly forward, and the right arm is pulled back. FIG. 26 shows a state following the state of FIG. 25, and FIG. 27 shows a state following the state of FIG. 26, where the left leg touches the ground, and both arms are pulled back to be raised. FIG. 28 shows a state following the state of FIG. 27, where the pulled-back arms start being raised.

Figure 29:
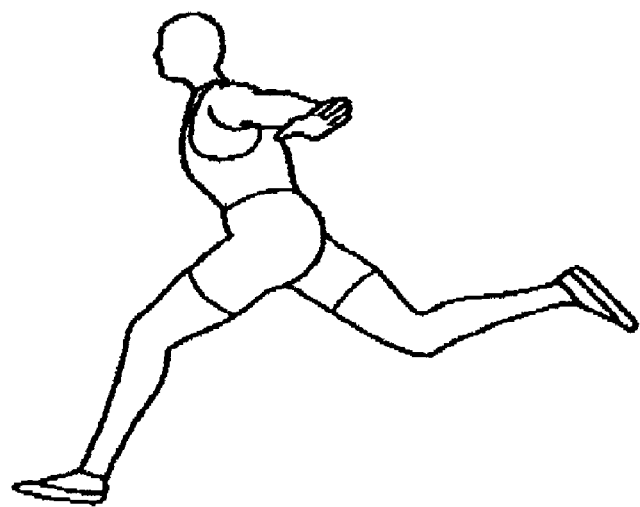
Figure 30:
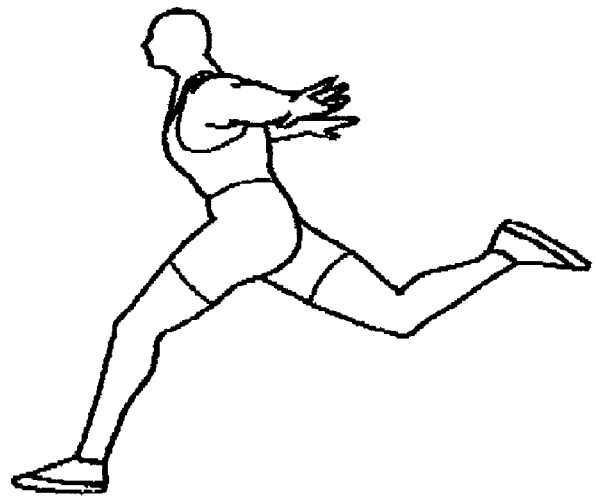
Figure 31:
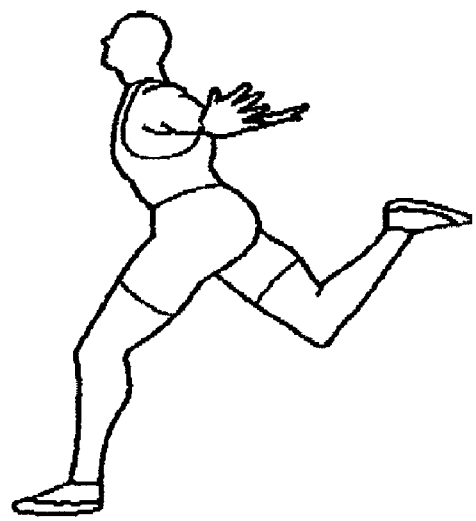
Figure 32:
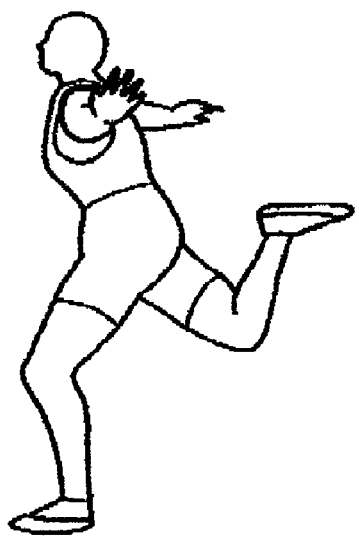
Figure 33:
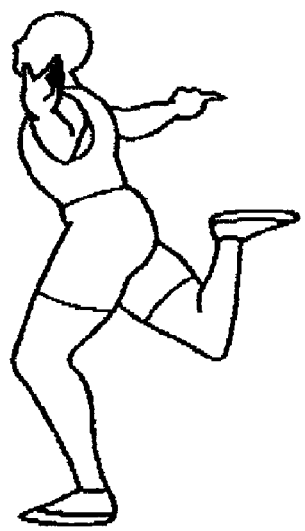

FIG. 20 shows a state following the state of FIG. 28, and FIG. 30 shows a state following the state of FIG. 29, where the both arms are gradually raised. FIG. 31 shows a state following the state of FIG. 30, where the chest starts being stuck out forward while the arms are further being raised. FIG. 32 shows a state following the state of FIG. 31, where the chest is further stuck out forward immediately before the play character MA reaches the goal. FIG. 33 shows a state following the state of FIG. 32, where the goal is reached with the chest stuck out, and both arms are further raised.

Figure 34:
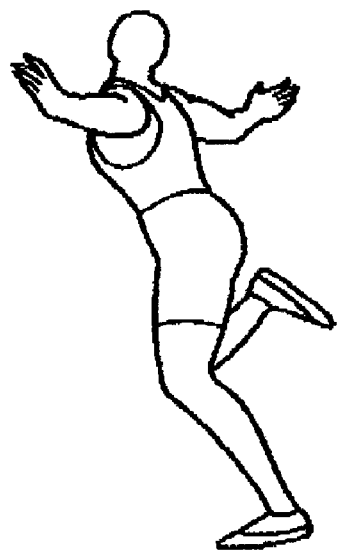
Figure 35:
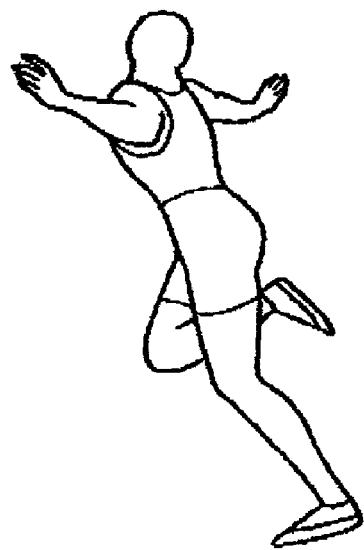
Figure 36:
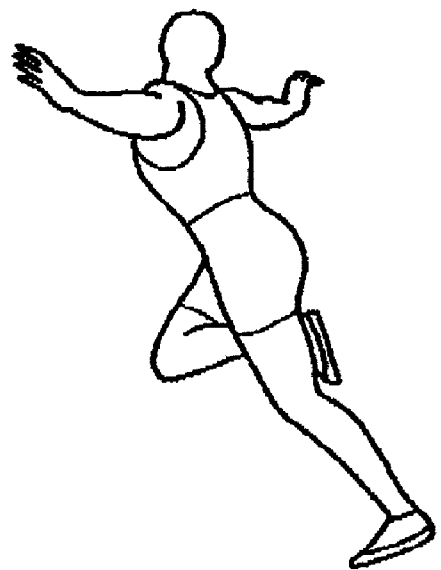
Figure 37:
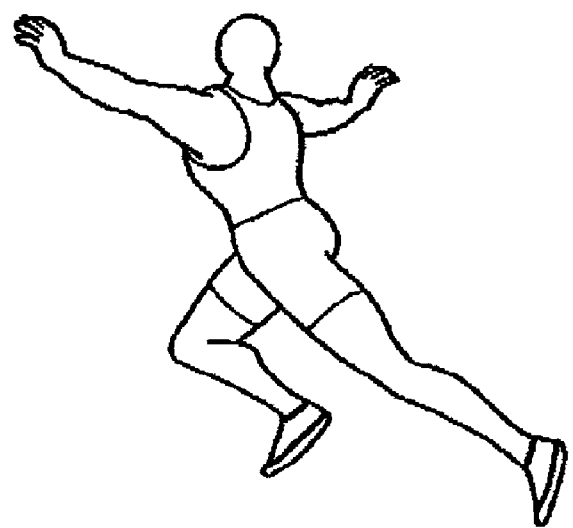
Figure 38:
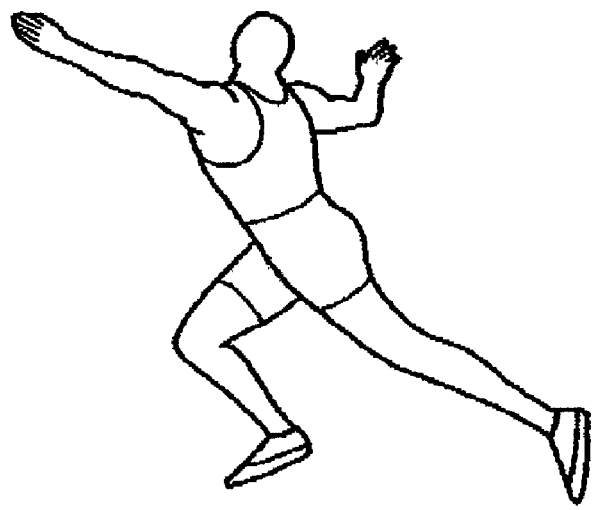
Figure 39:
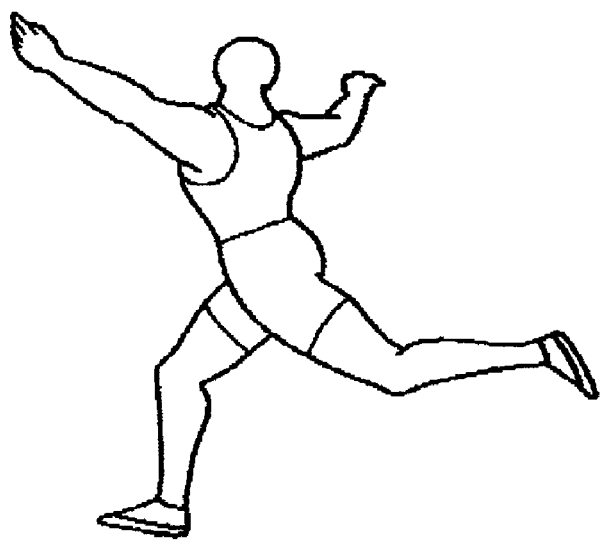

FIG. 34 shows a state following the state of FIG. 33, where the play character MA stretches both hands sideways and raises slightly up after passing the goal. FIG. 35 shows a state following the state of FIG. 34; FIG. 36 shows a state following the state of FIG. 35; FIG. 37 shows a state following the state of FIG. 36; and FIG. 38 shows a state following the state of FIG. 37. FIG. 39 shows a state following the state of FIG. 38 and corresponding to the final frame of the goal finishing action. In FIGS. 37 to 39, the play character M shows a victory pose by raising his hands up.

Image data for displaying images showing the starting action shown in FIG. 3 and the running action shown in FIGS. 4 through 20 (looped running animation) and the goal finishing action shown in FIGS. 21 through 39 are stored in the recording medium 122.

Figure 40:
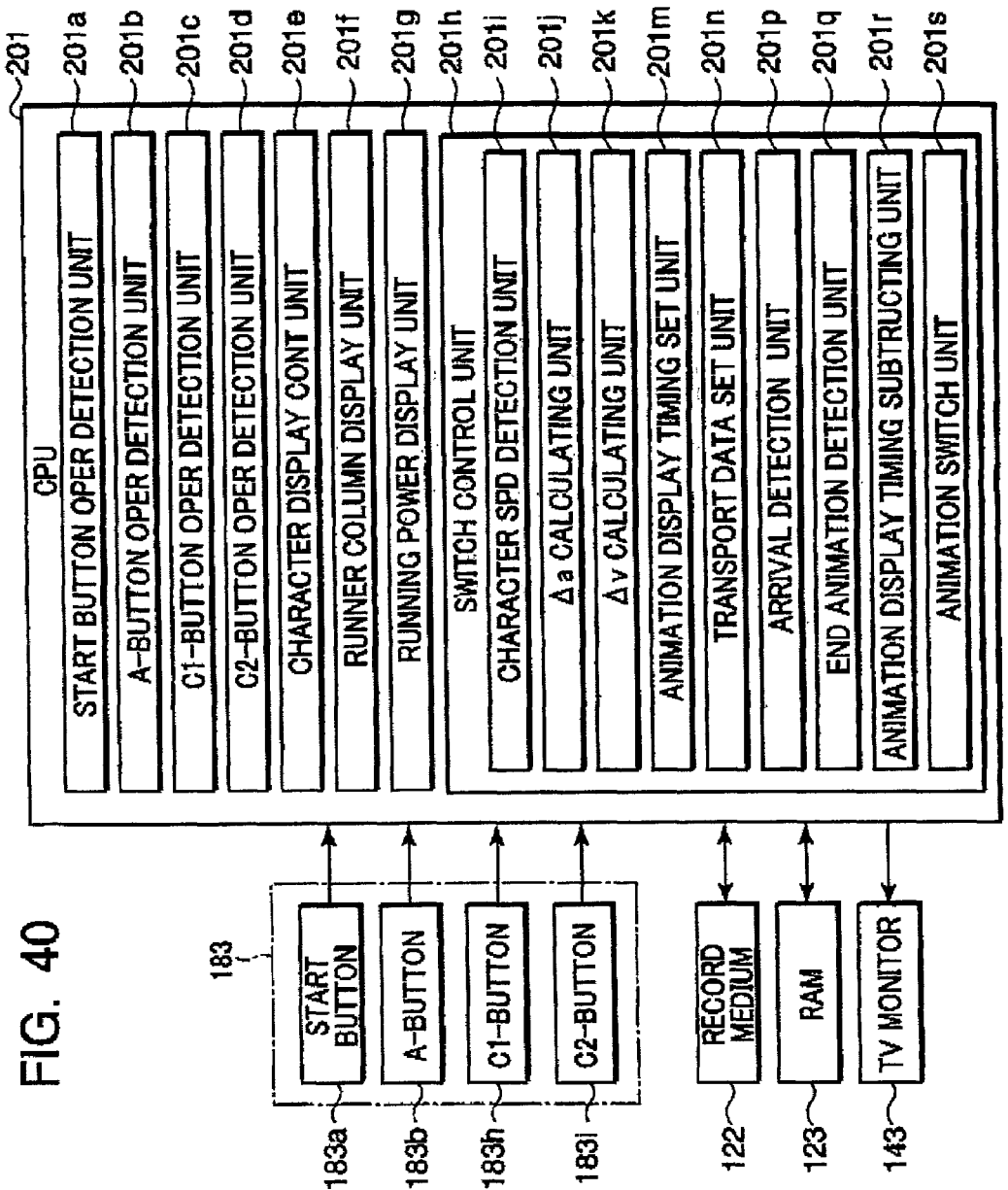
FIG. 40 is a block diagram showing functions of a CPU and various buttons in the video game system shown in FIG. 1.

FIG. 40 is a block diagram showing function realizing means of the CPU 201 when the 100M dash game is executed, the recording medium 122, the RAM 123, the television monitor 143 and the controller 183 (start button 183a, A-button 183b, C1-button 183h and C2-button 183i). Here, the interface circuits and buses are not shown in order to facilitate the description.

Specifically, the CPU 201, is provided with the respective function realizing means as a start button operation detecting unit 201a, an A-button operation detecting unit 201b, a C1-button operation detecting unit 201c, a C2-button operation detecting unit 201d, a character display control unit 201e, a runner column display unit 201f, a running power display unit 201g and a switch control unit 201h. The switch control unit 201h is provided with respective function realizing means as a character speed detecting unit 201i, a Δa calculating unit 201j, a Δv calculating unit 201k, an animation display timing setting unit 201m, a transport data setting unit 201n, an arrival detecting unit 201p, an end animation detecting unit 201q, an animation display timing subtracting unit 201r and an animation switching unit 201s.

The start button detecting unit 201a discriminates whether the start button 183a has been turned on or off in accordance with an operation signal from the start button 183a. A specified game is selected when the start button 183a is turned on. The A-button operation detecting unit 201b discriminates whether the A-button 183b has been turned on or off in accordance with an operation signal from the A-button 183b. The start of the game is enabled when the A-button 183b is turned on.

The C1-button operation detecting unit 201c discriminates whether the C1-button 183h has been turned on or off in accordance with an operation signal from the C1-button 183h. The C2-button operation detecting unit 201d discriminates whether the C2-button 183i has been turned on or off in accordance with an operation signal from the C2-button 183i. In other words, every time the C1-button 183h and the C2-button 183i are alternately and continuously turned on/off, the running power changes according to an operation amount per unit time.

The character display control unit 201e controls the display of the play character MA as the game is proceeded, and reads game screens corresponding to the game content from the RAM 123 and outputs them to the television monitor 143. The character display control unit 201e is also provided with functions of generating now image data for interpolating successive frames using image data (used to display images shown in FIGS. 4 through 20) prepared beforehand and constituting the looped running animation if necessary, and displaying the images based on the generated image data.

The runner column display unit 201f displays contents corresponding to the play character in the runner column KS. The power display unit 201g displays the running power generated according to the operated amounts of the C1-button 183h and the C2-button 183i every time these buttons are alternately and continuously turned on and off by coloring the power display column PD in chromatic colors.

The switch control unit 201h switches a first image data group (looped running animation) to a second image data group (goal finishing animation) such that the running action (first action) and the goal finishing action (second action) are successively displayed without any discontinuity (i.e. the running action is smoothly transitioned to the goal finishing action) when the play character MA reaches a specified position set beforehand. Specifically, if the play character MA is a first runner when arriving the predetermined position before the goal (e.g. 2 m before the goal), he is displayed to start taking a victory pose by raising both hands. In this case, the switch control unit 201h executes such a switch control that the motions of the legs and arms of the play character MA are continuous when the running action is transitioned to the goal finishing action. The goal finishing action for the play characters MA other than the first runner stops when they pass the goal.

The character speed detecting unit 201i discriminates the running speed of the play character MA in accordance with the number of signals outputted from the controller 183 since the running speed changes according to the operated amount of the controller 183 by the game player (the less operated amount, the slower, whereas the more operated amount, the faster).

The Δa calculating unit 201j calculates a change amount of animation "Δa" defined as how much an animation data of the motion along the time axis of the play character MA (animated model) advances within a predetermined period (1/60 sec.). In other words, the delta animation "Δa" can be defined as an amount of change of animations from a previous animation frame at a certain time (t) to an animation to be shown at a given time incremented with a predetermined time (t+Δt). Where "Δt" can be any given set time period such as 1/60 seconds but not limited thereto. Specifically, the running speed (moving speed) of the play character MA changes according to the operated amount of the controller 183 by the game player. However, if a plurality of frames of image data prepared at first for displaying the running action are used as they are, no smooth motion corresponding to a change of the running speed cannot be displayed. Thus, the delta animation Δa is used to generate new image data by interpolation based on the image data (image data used for displaying the images of FIGS. 4 through 20) prepared beforehand. This delta animation Δa is calculated by multiplying the level of the running power given according to the operated amount of the controller 183 by a predetermined coefficient (this coefficient is set when the game is designed).

The running action of the play character MA is executed at a basic speed set in advance even if the operated amount of the controller 183 is zero. On the other hand, when the controller 183 is operated, a running speed corresponding to the operated amount is added to the basic speed and the running action of the play character MA is executed at the resulting speed. Although all the frames set at first are used in the looped running animation in the case that the running action of the play character MA is executed at the basic speed, the number of frames constructing the looped running animation is reduced as the running speed is accelerated.

The $\Delta v$ calculating unit 201k calculates a moved amount (transport data) $\Delta v$ of the play character MA within the time period corresponding to the time period during which the change of delta animation $\Delta a$ takes place. This $\Delta v$ is calculated as follows. A coefficient $\Delta av$ of $\Delta v$ corresponding to the game content is set in view of $\Delta a$ when the game is designed, and $\Delta v$ is calculated by $\Delta v = \Delta a \times \Delta av$ based on the newly calculated $\Delta a$.

The coefficient $\Delta av$ is set as follows.

Now, it is assumed that A denotes the last animation display timing of the looped running animation. L denotes a distance over which the looped running animation is repeated (i.e. a distance from a reference position which is a position where the first frame of the looped running animation is displayed to the predetermined position before the goal), and n (integer) denotes the number of times the looped running animation is repeated over the distance L, a distance l (i.e. unit moved distance) the play character MA runs by executing (reproducing) the looped running animation once is l=L/n.

This distance l is obtained by multiplying A by a certain coefficient, which is set at $\Delta av$. In other words, since $l = A \times \Delta av$, the coefficient $\Delta av$ is calculated by $\Delta av = l/A = (L/n)/A$.

It should be noted that the distance l (unit moved distance) is set at a constant value regardless of the running speed of the play character MA, and the distance between the reference position and the predetermined position (e.g. 2 m before the goal) is set at a multiple of the distance l (unit moved distance).

The animation display timing setting unit 201m adds $\Delta a$ calculated by the $\Delta a$ calculating unit 201j to the initially set animation display timing, and saves the thus obtained value in the RAM 123 as a new animation display timing. Specifically, if the initially set animation display timing is, for example, "15" and the newly calculated $\Delta a$ is "0.3", "15.3" is used as the new animation display timing. In this way, an image data is generated to, for example, display a now image corresponding to the $(15.3)^{th}$ frame between the image data representing the $15^{th}$ frame and the image data representing the $16^{th}$ frame based on these image data.

This image data can be obtained by, for example, storing apex coordinate data, angle data and line data of a plurality of polygons whose movements are linked with the movements of the respective skeletons forming the play character MA (animation) in a table in correspondence with the respective skeletons and calculating the positions and orientations of the polygons in the space coordinate systems as the space coordinate systems and amounts of rotation of the respective skeletons are determined.

The transport data setting unit 201n adds the newly calculated $\Delta v$ to the transport data when $\Delta v$ is calculated by the $\Delta v$ calculating unit 201k, and saves the thus obtained value in the RAM 123 as a new transport data. In this way, coordinate data for the new image, e.g., corresponding to the $(15.3)^{th}$ frame are given. The animation display timing setting unit 201m and the transport data setting unit 201n construct an image data generating unit for generating an image data newly required by changing the running speed.

The arrival detecting unit 201p discriminates whether the play character MA has reached the predetermined position away from the starting position by a specified distance, i.e. whether the play character MA has reached a position immediately before the goal of the 100M dash (e.g. 2 m before the goal) where he starts taking a victory pose. This discrimination is made to determine a timing at which the image data group (looped running animation) displaying the running action is switched to the image data group (goal finishing animation) displaying the goal finishing action.

The end animation detecting unit 201q discriminates whether the presently displayed image is an animation display timing corresponding to the image at the end of the looped running animation. In other words, it is discriminated whether the image of the play character MA presently displayed is the last image of the image data group (looped running animation) displaying the running action.

The animation display timing subtracting unit 201r subtracts the animation display timing corresponding to the last image from the present animation display timing in a series of images (looped running animation) displaying the running action. Specifically, in the case that the animation display timing (present animation display timing) of the image presently displayed exceeds the animation display timing (last animation display timing) of the last image in the looped running animation (i.e. in the case that the last image becomes, for example, $(17.3)^{th}$ frame by changing the running speed of the play character MA when the last one of the initially set images is, for example, the $17^{th}$ frame), an animation display timing for an image to be displayed next is calculated (i.e. 0.3 obtained by subtracting 17 from 17.3 is an animation time for the image to be displayed next).

Figure 45A:
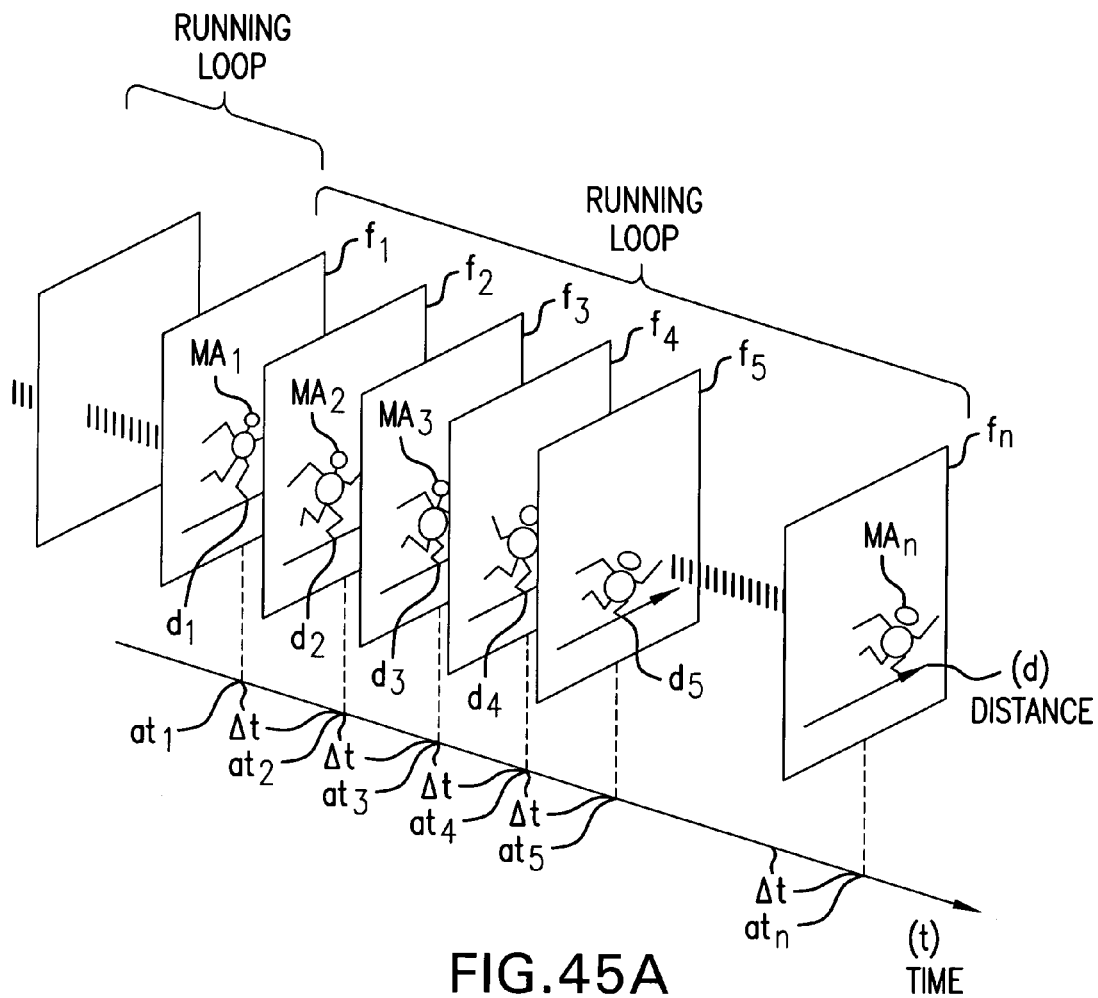
Figure 45B:
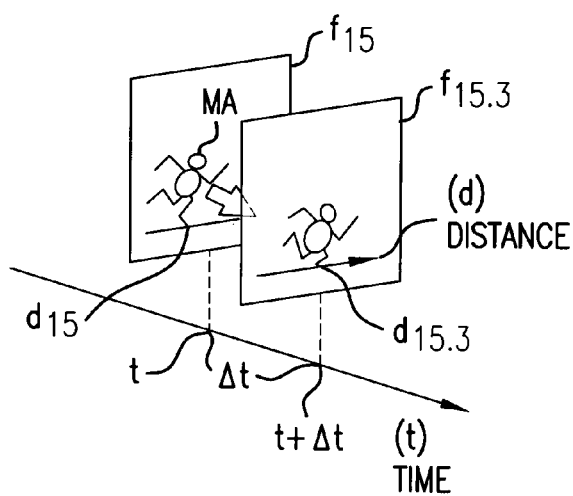
Figure 45C:
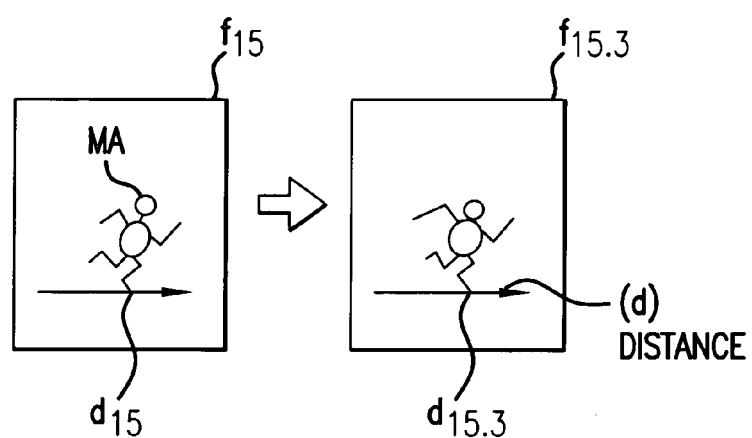

In order to clarify and sum up the aforementioned terminology, FIGS. 45A, 45B, and 45C are prepared. As previously defined, the terms used to describe the movement of the playing character MA according to the embodiments of the present application, but not limited thereto, are as follows.

"at(1)" through "at(n)": animation displaying timings corresponding to each frame carrying an image of play character MA;

delta animation "$\Delta a$": an amount of change of animations from a previous animation frame at a certain time (t) to an animation to be shown at a given time incremented with a predetermined time (t+$\Delta t$).

"$\Delta t$": any given set time period such as 1/60 seconds but not limited thereto;

"$\Delta v$": a moved amount (transport data) $\Delta v$ of the play character MA within the time period corresponding to the time period during which the change of delta animation $\Delta a$ takes place.

FIG. 45A is an explanatory diagram illustrating a series of change of frames along a time line when the operation controller 183 is not operated. As can be seen, each of all the frames "f1" through "fn" is sequentially displayed at a time interval $\Delta t$. Noted with "d1" through "dn" are respective positions of the play character MA in each of the frames, "f1" through "fn", along a distance line (d). It should be noted that the moved amount of the play character MA in a single running loop, i.e., an amount corresponding to "dn−d1" is set at a constant value.

FIG. 45B is also an explanatory diagram illustrating a single segment of the change of succeeding frames along a time line (t) when the operation controller 183 is operated.

The 15$^{th}$ frame "f15" is displayed at a time "t"; however, 16$^{th}$ frame "f16" is no longer displayed at time "t+Δt" because of the operation of the operation controller 183. Instead, 15.3th frame needs to be displayed at time "t+Δt". This small change, "15.3th frame"–"15$^{th}$ frame" is called delta animation Δa.

FIG. 45C is also an explanatory diagram illustrating a moved amount (transport data) Δv of the play character MA within the time period corresponding to the time period during which the change of delta animation Δa takes place. As can be seen in the FIG. 45C, a small change between d15 position and d15.3 position along a line (distance) d corresponds to Δv of the play character MA.

The animation switching unit 201s switches the image data group (looped running animation) for displaying the images representing the running action to the image data group (goal finishing animation) for displaying the images representing the goal finishing action.

Figure 41:
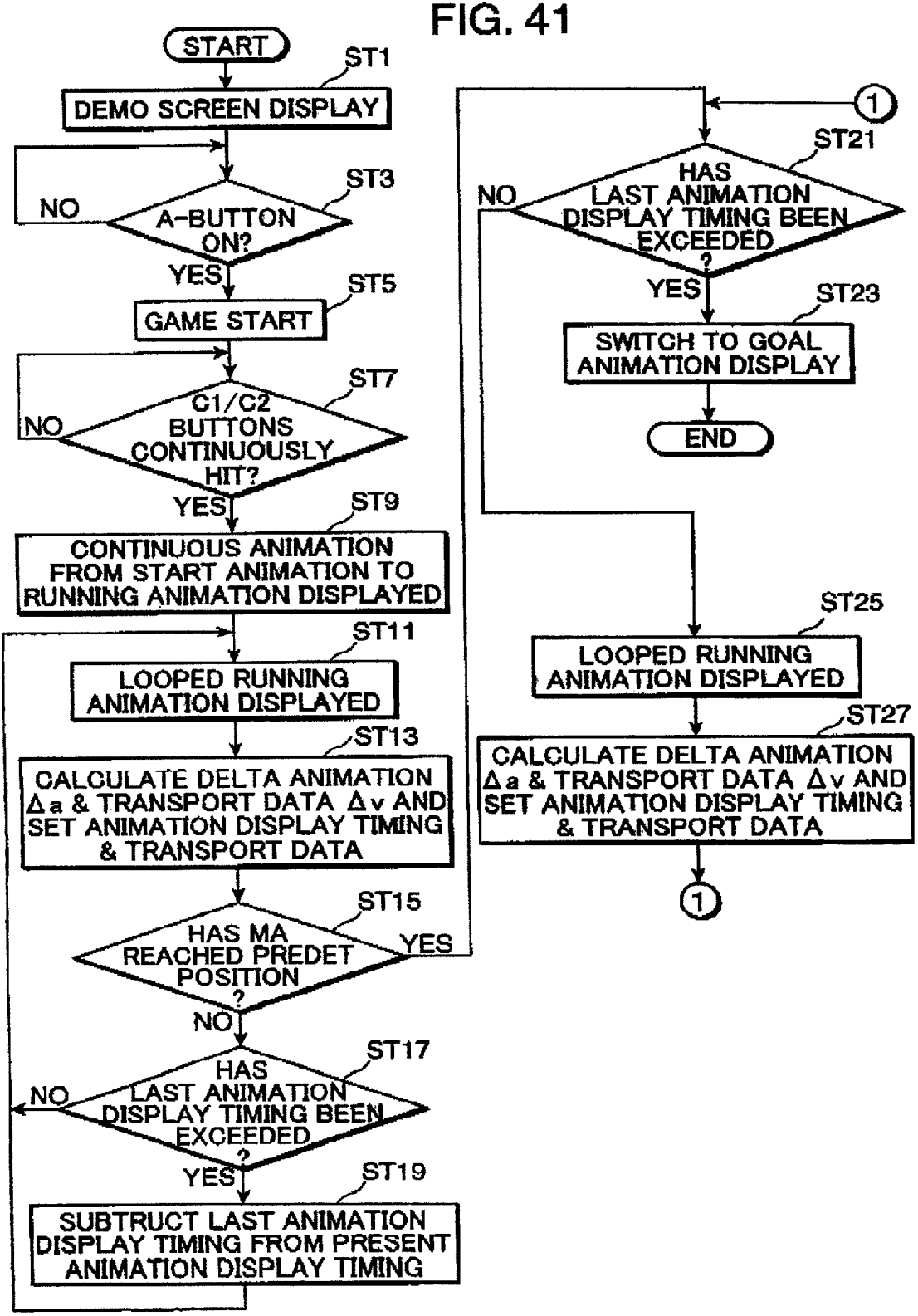
FIG. 41 is a flow chart showing the operation of the video game system shown in FIG. 1, FIGS. 42 to 44 are diagrams showing game screens displayed in the video game system shown in FIG. 1, and FIGS. 45A to 45C are explanatory diagrams illustrating a change of frames along a time line.
Figure 42:
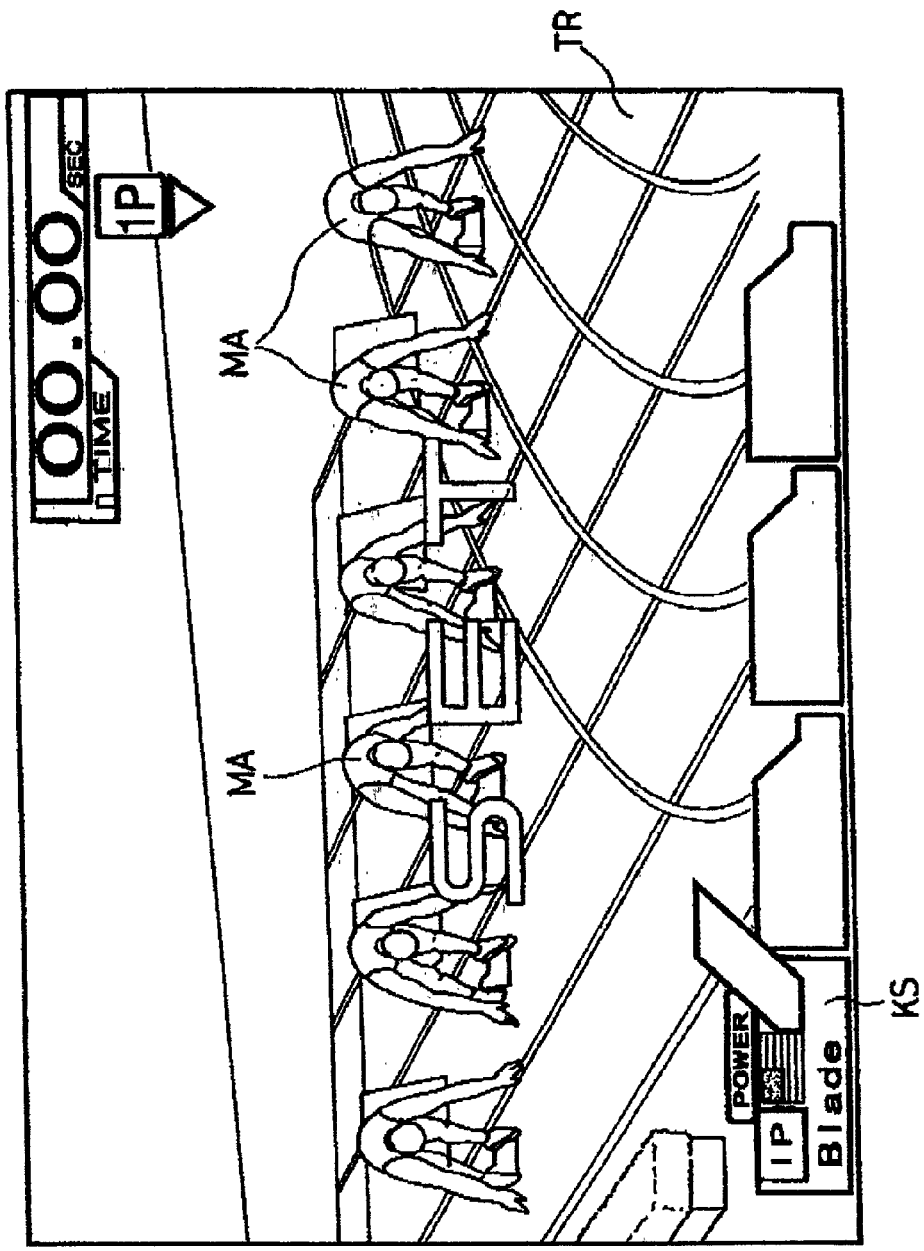
Figure 43:
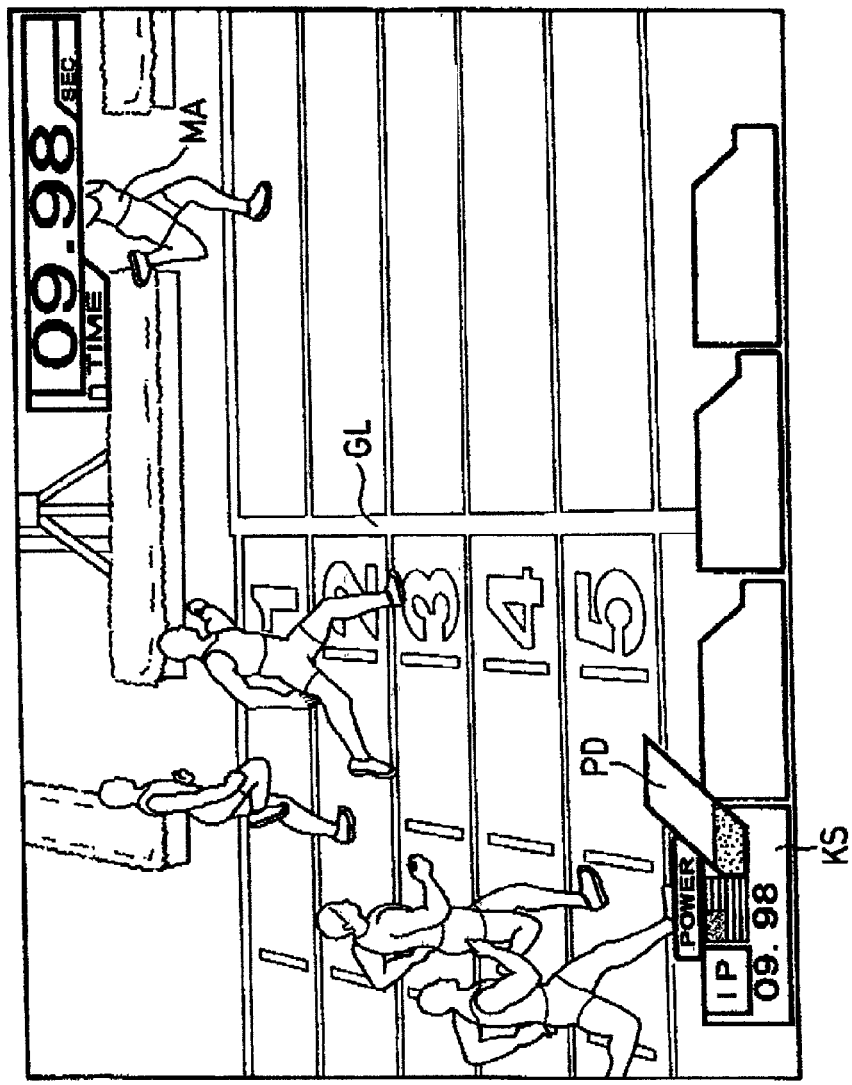
Figure 44:
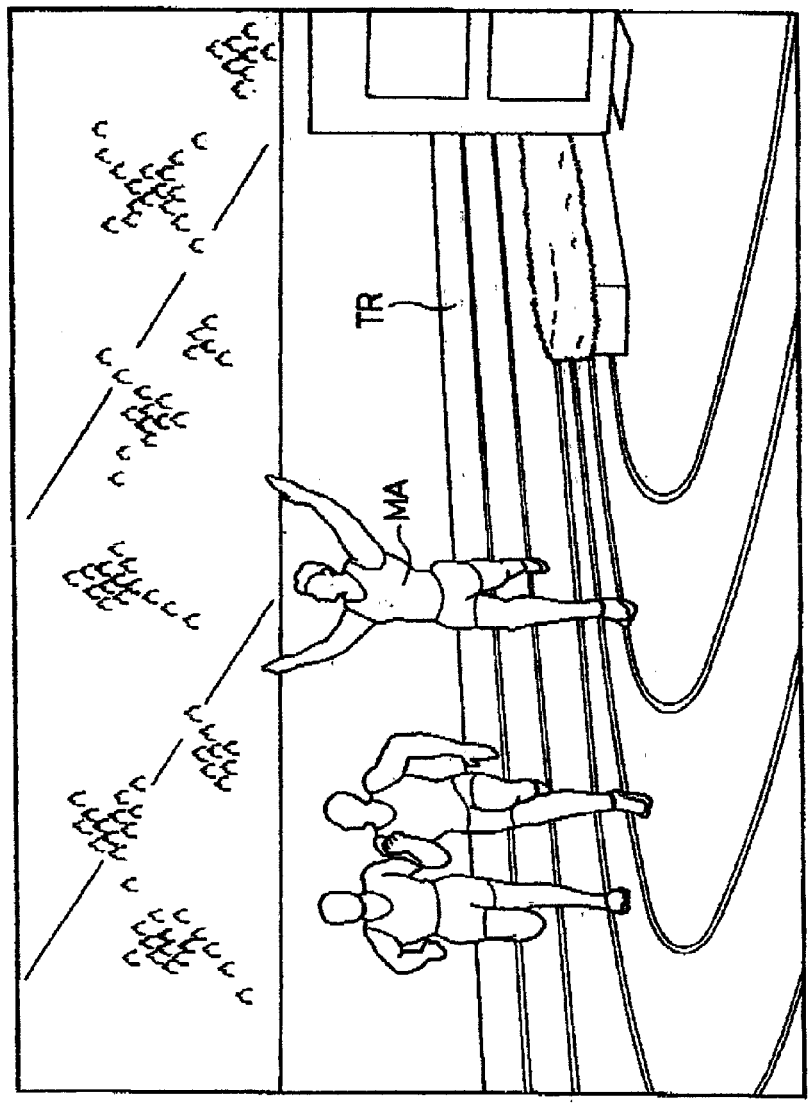

Next, the operation of the video game system 10 is described with reference to a flow chart shown in FIG. 41 and game screens shown in FIGS. 42 to 44. Here, it is assumed that a single-player game is executed. Accordingly, running of the player character MA on the first course at the innermost side of the track TR is controlled by the game player, but running of the remaining five play characters MA is controlled by the preset data.

First, when the 100M dash game is selected by turning the start button 183a on, a demonstration screen is displayed (Step ST1). The A-button operation detecting unit 201b then discriminates whether the A-button 183b has been turned on (Step ST3). The game is started (Step ST5) if the discrimination result in Step ST3 is affirmative, and six play characters MA get ready at the starting line to initiate the starting action. At this time, "SET" is displayed in the middle of the game screen. Thereafter, "SET" disappears and "GO" is displayed instead, thereby entering a state where the operation signals from the C1-button 183h and the C2-button 183i can be received. This routine waits on standby until the A-button 183b is turned on if the discrimination in Step ST3 is negative. It should be noted that the same may be started by turning the start button 183a on again.

Subsequently, the C1-button and C2-button operation discrimination unit 201d, 201e discriminate whether the C1-button 183h and the C2-button 183i are being continuously hit (Step ST7). If the discrimination in Step ST7 is affirmative, the respective play characters MA dash off from the starting line to start running at once. Specifically, a continuos animation (not shown) from the starting animation displaying a series of motions at the time of the start to the looped running animation displaying a series of running motions is displayed (step ST9). The running power is generated by continuously hitting the C1-button 183h and the C2-button 183i, and the generated running power is displayed in the power display column PD by the running power display unit 201g.

Subsequently, the looped running animation, i.e. a series of images shown in FIGS. 4 through 20 are successively displayed, for example, every ⅟60 sec. by the character display control unit 201e (Step ST11) and simultaneously the delta animation Δa and the transport data Δv are calculated by the Δa calculating unit 201j and the Δv calculating unit 201h and saved in the RAM 123 by the animation display timing setting unit 201m and the transport data setting unit 201n, respectively (Step ST13). Specifically, the images of the looped running animation are successively displayed, e.g. every ⅟60 sec. by calculating the delta animation Δa and the transport data Δv, saving them in the RAM 123 every time one frame of image is displayed (e.g. every ⅟60 sec.), determining an animation display timing for an image to be displayed next based on the calculated delta animation Δa and the transport data Δv, and giving coordinate values to the image corresponding to the determined animation display timing. A series of images shown in FIGS. 4 through 20 and the images (images interpolating the successive frames of the images shown in FIGS. 4 through 20) based on the image data newly generated by changing the running speed of the play character MA are successively displayed, and this series of images (looped running animation) are repeatedly displayed until the play character MA reaches the predetermined position (e.g. 2 m before the goal). The game screen of FIG. 2 is displayed based on the looped running animation.

Subsequently, the arrival detecting unit 201p discriminates whether the play character MA has reached the predetermined position immediately before the goal (Step ST15). The end animation detecting unit 201q discriminates whether the animation display timing corresponding to the last image has been exceeded (Step ST17) if the discrimination result in Step ST15 is negative. If the discrimination result in Step ST17 is affirmative, the animation display timing subtracting unit 201r subtracts the last animation display timing corresponding to the last image from the present animation display timing corresponding to the presently displayed image (Step ST19). In this way, an animation display timing for an image to be displayed next is obtained.

This routine then returns to Step ST11 to repeat the subsequent operations. By repeating the operations from Steps ST11 to ST19, when the play character MA having started running from the starting position reaches the predetermined position (e.g. 2 m before the goal), the last image corresponding to the lest animation display timing or an image corresponding to an animation display timing approximate to the last animation display timing (i.e. an image newly generated between the first image and the succeeding image) is constantly set even if the running speed is changed through operation of the controller 183 by the game player. Thus, the action can be smoothly switched from the looped running animation to the goal finishing animation without any discontinuity.

When the discrimination result in Step ST17 is negative, this routine returns to Step ST11 to repeat the subsequent operations. Further, if the discrimination result in Step ST15 is affirmative, the end animation detecting unit 201q discriminates whether the last animation display timing has been exceeded (Step ST21). If the discrimination result in Step ST21 is affirmative, the animation switching unit 201s switches the looped running animation to the goal finishing animation to display the goal finishing, action (Step ST23) FIG. 43 shows a state immediately after the first runner passed a goal line GL, and FIG. 44 shows a state where the first runner raises both hands to pose for victory. The motions for this victory pose are started at the predetermined position immediately before the goal as described above.

If the discrimination result in Step ST21 is negative, the images of the looped running animation (a series of images shown in FIGS. 4 through 20 and the images newly generated between successive frames) are then successively displayed by the character display control unit 201e (Step ST25) and simultaneously the delta animation Δa and the transport data Δv are calculated by the Δa calculating unit 201j and the Δv calculating unit 201h as in Step ST13 (Step ST27). Then, this routine returns to Step ST21 to repeat the subsequent operations. The operations after Step ST25 in the case that the discrimination result in Step ST21 is negative are mainly executed to correct calculation errors in Step ST13 and other Steps.

As described above, according to this embodiment, the first image data group (looped running animation) comprised of a plurality of frames of image data for displaying the running action as the first action and the second image data group (goal finishing animation) comprised of a plurality of frames of image data for displaying the goal finishing action as the second action are prepared, and the first image data group is so switched to the second image data group that the goal finishing action smoothly successively follows the running action without any discontinuity when the player character reaches the predetermined position by repeatedly displaying the first action. Accordingly, the play character can be moved by a desired distance by the running action as the first action only by repeatedly displaying the first image data group (looped running animation), and images displayed on the game screen cause the game player to have no feeling of incongruity since the running action and the goal finishing action are smoothly successively displayed to switch without any discontinuity. Thus, a memory capacity can be saved, and a time required for the development of a program can also be saved, thereby effectively suppressing an increase in production costs.

The present invention is not limited to the foregoing embodiment, and may take various embodiments as described below.

(1) In the foregoing embodiment, the running distance (basic moved distance) of the play character MA by one reproduction of the looped running animation is set at a constant value even if the running speed (moving speed) of the play character MA is changed according to the operated amount of the controller 183 by the game player. However, according to the present invention, the running distance (basic moved distance) of the play character MA per looped running animation may be changed as the running speed (moving speed) of the play character MA is changed.

(2) Although the distance from the reference position to the predetermined position is set at a multiple of the unit moved distance by the first action (i.e. moved distance by one reproduction of the looped running animation) in the foregoing embodiment, it may be not necessarily set at a multiple, but may be arbitrarily set according to the present invention. In such a case, when the play character MA reaches the predetermined position, the image data of a specified frame of the first image data group other than the last frame or a frame near the last frame may, for example, be switched to the image data of the frame of the second image data group relating to the image data of the specified frame of the first image data group.

(3) In the foregoing embodiment, a new image data is generated by interpolation based on the initially set image data to smoothly display the running action in the case that the running speed of the play character MA is changed. However, according to the present invention, a multitude of frames of image data may be initially prepared, and necessary image data may be suitably selected from these image data to smoothly display a specific action.

(4) Although the 100M dash game is described as a field and track game to be executed in the foregoing embodiment, the present invention is also applicable to various other games. For instance, the present invention is applicable to short-distance running games other than the 100M dash game or long-distance running games such as a marathon game as field and track games. In other words, the present invention is applicable to any game in which the first action and the second action which successively follows the first action are prepared, and the images displayed on a game screen need to be such that the motions thereof do not cause the game player to have any feeling of incongruity when the first action is switched to the second action. For example, the present invention is also applicable to a swimming game. In the running game, a swimming action to a turning point corresponds to the running action of the 100M dash game, and a turning action which is started at a predetermined position immediately before the turning point corresponds to the goal finishing action of the 100M dash game.

As described above, according to the present invention, the first image data group comprised of a plurality of frames of image data for displaying the first action relating to the moving action and the second image data group comprised of a plurality of frames of image data for displaying the second action are prepared, and the first image data group is so switched to the second image data group that the second action successively follows the first action without any discontinuity when the player character reaches the predetermined position by repeatedly executing the first action.

Accordingly, the play character can be moved by a desired distance through repeated execution of the first action by repeatedly displaying the images based on the plurality of frames of image data, and the images displayed on the game screen cause the game player to have no feeling of incongruity since the first action relating to the moving action and the second action are smoothly successively displayed without any discontinuity. Thus, a memory capacity can be saved, and a time required for the development of a program can also be saved, thereby effectively suppressing an increase in production costs.

Further, according to the present invention, a specified frame of image data of the first image data group may be switched to a frame of image data of the second image data relating the specified frame when the play character reaches the predetermined position. By doing so, the game player is caused to have no feeling of congruity upon viewing the successive images of the first action relating to the moving action and the second action which are displayed on the game screen.

Further, according to the present invention, the specified frame may be the last frame of the first image data group or a frame relating to the last frame, and the frame of the second image data group relating to the specified frame may be the first frame thereof. This securely prevents a feeling of incongruity from being caused when the game player views the successive images of the first action relating to the moving action and the second action.

Further, according to the present invention, the first image data group may include image data generated between successive frames using the image data prepared beforehand. Then, minimally necessary image data can be set for displaying the first action, which enables a further reduction of the memory capacity. As a result, an increase in production costs can be effectively suppressed.

Further, according to the present invention, the moving speed of the play character by the first action may vary according to the operated amount of the operation member, the unit moved amount of the play character by the first action may be set at a constant value regardless of the moving speed of the play character, and the distance of the predetermined position from the reference position may be a multiple of the unit moved amount.

With this arrangement, the switching position of the first and second actions can be set beforehand. This results in easier designing of the game and reduction of burdens on the CPU by reducing calculation steps.

This application is based on Japanese application serial no. 2000-15103 filed on Jan. 24, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A video game device for displaying a play character on a game screen displayed on a monitor, comprising:
   an operation member for moving the play character from a reference position to a predetermined position in a game space,
   a storage unit arranged to store a first image data group including a plurality of frames of image data which provide a display of a first action relating to the moving action of the play character and a second image data group including a plurality of frames of image data which provide a display of a second action of the play character different from the first action,
   a display control unit for reading the first and second image data groups from the storage unit and displaying the action of the play character based on the read frames of image data, the display control unit being arranged to consecutively display the frames of image data at a constant time interval, and
   a switch control unit for switching the first image data group to the second image data group such that the first action and the second action are smoothly successively displayed without any discontinuity when the play character reaches the predetermined position by repeatedly displaying the first action,
   the display control unit being coupled to the operation member and being arranged to sequentially display an image corresponding to each of the plurality of frames of the image data for the first action repeatedly sequenced at a base rate corresponding to the constant time interval and related to the moving action of the play character stored in the storage unit when the operation member is not operated and during the movement of the play character from the reference position to the predetermined position such that the same moving action of the play character is repeatedly displayed when the operation member is not operated,
   when the operation member is being operated, the display control unit being arranged to generate new image data for a new frame to be created between successive frames stored in the storage unit by interpolation between the successive frames repeatedly sequenced at a rate differing from said base rate based on a repetition rate of the operation of the operation member and then to display the newly generated image data to present the first action at said rate differing from said base rate.

2. A video game device according to claim 1, wherein a specified frame of image data of the first image data group is switched to a frame of image data of the second image data related to the specified frame when the play character reaches the predetermined position.

3. A video game device according to claim 1, wherein the specified frame is the last frame of the first image data group or a frame relating to the last frame, and the frame of the second image data group relating to the specified frame is the first frame thereof.

4. A video game device according to claim 1, wherein the moving speed of the play character displayed on the monitor by the first action varies according to the repetition rate of the operation of the operation member, the unit moved amount of the play character by the first action being defined as a distance of the movement of the play character in said plurality of frames of image data for the first action and being set at a constant value regardless of the moving speed of the play character, and the distance of the predetermined position from the reference position is a multiple of the unit moved amount.

5. A video game device according to claim 1, wherein when the operation member is being operated, the display control unit is arranged to display the newly generated image data such that the number of frames displayed in a predetermined time is reduced when the operation member is operating in comparison to when the operation member is not operated.

6. A video game device according to claim 1, wherein the play character is human, the first action is a running action of the human and the second action is an action performed by a human after reaching a finish line of an athletic competition.

7. The video game device according to claim 1, wherein the operation of the operating member includes alternate operation of at least two operating members.

8. A video game device according to claim 1, wherein the repetition rate of the operation of the operation member is multiplied by a predetermined coefficient set for the game to obtain a delta animation value, the display control unit being arranged to generate the new image data for the new frame to be created between successive frames stored in the storage unit by interpolation between the successive frames based on the delta animation value.

9. A character action setting method in a video game in which a play character is displayed on a game screen on a monitor and moved from a reference position to a predetermined position in a game space by operating an operation member, the method comprising the steps of:
   preparing a first image data group including a plurality of frames of image data for displaying a first action relating to the moving action of the play character and a second image data group including a plurality of frames of image data for displaying a second action different from the first action;
   consecutively displaying a frame of image data at a constant time interval, said step of displaying a frame of image data comprising the steps of
      sequentially displaying an image corresponding to each of the plurality of frames of the image data for the first action repeatedly sequenced at a base rate corresponding in to the constant time interval and related to the moving action of the play character when the operation member is not operated and during the movement of the play character from the reference position to the predetermined position such that the same moving action of the play character is repeatedly displayed when the operation member is not operated, and
   upon operation of the operation member,
      generating new image data for a new frame to be created between successive frames by interpolation between the successive frames repeatedly sequenced at a rate differing from said base rate based on a repetition rate of the operation of the operation member, and displaying the newly generated image data to present the first action at said rate differing from said base rate; and switching the first image data group to the second image data group such that the first action and the second action are smoothly successively displayed without any discontinuity when the play character reaches the predetermined position by repeatedly displaying the first action.

10. A character action setting method according to claim 9, wherein a specified frame of image data of the first image data group is switched to a frame of image data of the second image data related to the specified frame when the play character reaches the predetermined position.

11. A character action setting method according to claim 9, wherein the specified frame is the last frame of the first image data group or a frame relating to the last frame, and the frame of the second image data group relating to the specified frame is the first frame thereof.

12. A character action setting method according to claim 9, wherein the moving speed of the play character displayed on the monitor by the first action varies according to the repetition rate of the operation of the operation member, further comprising the steps of defining a unit moved amount as a distance of the movement of the play character in the plurality of frames of image data for the first action and setting the unit moved amount of the play character by the first action at a constant value regardless of the moving speed of the play character, and the distance of the predetermined position from the reference position is a multiple of the unit moved amount.

13. A character action setting method according to claim 9, wherein the newly generated image data is displayed such that the number of frames displayed in a predetermined time is reduced when the operation member is operating in comparison to when the operation member is not operated.

14. A character action setting method according to claim 9, wherein the play character is human, the first action is a running action of the human and the second action is an action performed by a human after reaching a finish line of an athletic competition.

15. The method according to claim 9, wherein the operation of the operating member includes alternate operation of at least two operating members.

16. A computer-readable recording medium storing a character action setting program in a video game in which a play character is displayed on a game screen on a monitor and moved from a reference position to a predetermined position within a game space by operating an operation member, the character action setting program comprising the steps of:

preparing a first image data group including a plurality of frames of image data for displaying a first action relating to the moving action of the play character and a second image data group including a plurality of frames of image data for displaying a second action different from the first action;

consecutively displaying a frame of image data at a constant time interval, said step of displaying a frame of image data comprising the steps of sequentially displaying an image corresponding to each of the plurality of frames of the image data for the first action repeatedly sequenced at a base rate corresponding to the constant time interval and related to the moving action of the play character when the operation member is not operated and during the movement of the play character from the reference position to the predetermined position such that the same moving action of the play character is repeatedly displayed when the operation member is not operated, and upon operation of the operation member, generating new image data for a new frame to be created between successive frames by interpolation between the successive frames repeatedly sequenced at a rate differing from said base rate based on a repetition rate of the detected operation of the operation member, and displaying the newly generated image data to present the first action at said rate differing from said base rate; and switching the first image data group to the second image data group such that the first action, and the second action are smoothly successively displayed without any discontinuity when the play character reaches the predetermined position by repeatedly displaying the first action.

17. A computer-readable recording medium according to claim 16, wherein a specified frame of image data of the first image data group is switched to a frame of image data of the second image data related to the specified frame when the play character reaches the predetermined position.

18. A computer-readable recording medium according to claim 17, wherein the specified frame is the last frame of the first image data group or a frame relating to the last frame, and the frame of the second image data group relating to the specified frame is the first frame thereof.

19. A computer-readable recording medium according to claim 16, wherein the moving speed of the play character displayed on the monitor by the first action varies according to the repetition rate of the operation of the operation member, further comprising the steps or defining a unit moved amount as a distance of the movement of the play character in the plurality of frames of image data for the first action and setting the unit moved amount of the play character by the first action at a constant value regardless of the moving speed of the play character, and the distance of the predetermined position from the reference position is a multiple of the unit moved amount.

20. A computer-readable recording medium according to claim 16, wherein the newly generated image data is displayed such that the number of frames displayed in a predetermined time is reduced when the operation member is operating in comparison to when the operation member is not operated.

21. A computer-readable recording medium according to claim 16, wherein the play character is human, the first action is a running action of the human and the second action is an action performed by a human after reaching a finish line of an athletic competition.

22. The recording medium according to claim 16, wherein the operation of the operating member includes alternate operation of at least two operating members.

23. A video game device for displaying a human play character on a game screen displayed on a monitor, comprising:

an operation member for moving the human play character from a reference position to a predetermined position in a game space, a storage unit for storing a first image data group including a plurality of frames of image data for displaying a first action relating to the moving action of the play character and a second image data group including a plurality of frames of image data for displaying a second action, a display control unit for reading the first and second image data groups from the storage unit and displaying the action of the play character based on the read frames of image data, the display control unit being arranged to consecutively display the frames of image data at a constant time interval, said display control unit being arranged such that the moving speed of the play character displayed on the monitor by the first action varies according to the operated amount of the operation member, the unit moved amount (l) being defined as a distance of the movement of the play character in said plurality of frames of image data for the first action and being set at a constant value regardless of the moving speed of the play character, and the distance (L) of the predetermined position from the reference position is a multiple of the unit moved amount (l) and a switch control unit for switching the first image data group to the second image data group such that the first action and the second action are smoothly successively displayed without any discontinuity when the play character reaches the predetermined position by repeatedly displaying the first action, the display control unit being coupled to the operation member and being arranged to sequentially display an image corresponding to each of the plurality of frames of the image data for the first action stored in the storage unit when the operation member is not operated, when the operation member is being operated, the display control unit being arranged to generate new image data for a new frame to be created between successive frames stored in the storage unit by interpolation between the successive frames based on the operation of the operation member and then to display the newly generated image data.

24. A video game device according to claim 23, wherein the first action is a running action of the human and the second action is an action performed by a human after reaching a finish line of an athletic competition.

25. The video game device according to claim 23, wherein:

the display control unit consecutively displays the frames of image data at the constant time interval so as to display the play character moving at a base rate speed; and said display control unit is arranged such that the moving speed of the play character displayed on the monitor by the first action varies from the base rate according to a repetition rate of the operated amount of the operation member.

26. The video game device according to claim 25, wherein the operation of the operating member includes alternate operation of at least two operating members.

27. A character action setting method in a video game in which a human play character is displayed on a game screen on a monitor and moved from a reference position to a predetermined position in a game space by operating an operation member, the method comprising the steps of:

preparing a first image data group including a plurality of frames of image data for displaying a first action relating to the moving action of the play character and a second image data group including a plurality of frames of image data for displaying a second action;

consecutively displaying a frame of image data at a constant time interval, said step of displaying a frame of image data comprising the steps of sequentially displaying an image corresponding to each of the plurality of frames of the image data for the first action when the operation member is not operated, and upon operation of the operation member, varying the moving speed of the play character displayed on the monitor by the first action according to the operated amount of the operation member, defining a unit moved amount(l) as a distance of the movement of the play character in the plurality of frames of image data for the first action;

setting the unit moved amount (l) of the play character by the first action at a constant value regardless of the moving speed of the play character, setting the distance (L) of the predetermined position from the reference position as a multiple of the unit moved amount (l), generating new image data for a new frame to be created between successive frames by interpolation between the successive frames based on the operation of the operation member, and displaying the newly generated image data such that the number of frames for the first action displayed in a predetermined time is reduced when the operation state of the operation member is changed; and switching the first image data group to the second image data group such that the first action and the second action are smoothly successively displayed without any discontinuity when the play character reaches the predetermined position by repeatedly displaying the first action.

28. A character action setting method according to claim 27, wherein the first action is a running action of the human and the second action is an action performed by a human after reaching a finish line of an athletic competition.

29. The method according to claim 27, wherein:

said sequentially displaying an image corresponding to each of the plurality of frames of the image data for the first action when the operation member is not operated displays the play character moving at a base rate speed; and said varying the moving speed of the play character displayed on the monitor by the first action according to the operated amount of the operation member varies the moving speed from the base rate according to a repetition rate of the operated amount of the operation member.

30. The method according to claim 29, wherein the operation of the operating member includes alternate operation of at least two operating members.

31. A computer-readable recording medium storing a character action setting program in a video game in which a human play character is displayed on a game screen on a monitor and moved from a reference position to a predetermined position within a game space by operating an operation member, the character action setting program comprising the steps of:

preparing a first image data group including a plurality of frames of image data for displaying a first action relating to the moving action of the play character and a second image data group including a plurality of frames of image data for displaying a second action;

consecutively displaying a frame of image data at a constant time interval, said step of displaying a frame of image data comprising the steps of sequentially displaying an image corresponding to each of the plurality of frames of the image data for the first action when the operation member is not operated, and upon operation of the operation member, varying the moving speed of the play character displayed on the monitor by the first action according to the operated amount of the operation member, defining a unit moved amount(l) as a distance of the movement of the play character in the plurality of frames of image data for the first action;

setting the unit moved amount (l) of the play character by the first action at a constant value regardless of the moving speed of the play character, setting the distance (L) of the predetermined position from the reference position as a multiple of the unit moved amount (l), generating new image data for a new frame to be created between successive frames by interpolation between the successive frames based on the detected operation of the operation member, and displaying the newly generated image data such that the number of frames for the first action displayed in a predetermined time is reduced when the operation state of the operation member is changed; and switching the first image data group to the second image data group such that the first action, and the second action are smoothly successively displayed without any discontinuity when the play character reaches the predetermined position by repeatedly displaying the first action.

32. A computer-readable recording medium according to claim 31, wherein the first action is a running action of the human and the second action is an action performed by a human after reaching a finish line of an athletic competition.

33. The computer-readable recording medium according to claim 31, wherein:

said sequentially displaying an image corresponding to each of the plurality of frames of the image data for the first action when the operation member is not operated displays the play character moving at a base rate speed; and said varying the moving speed of the play character displayed on the monitor by the first action according to the operated amount of the operation member varies the moving speed from the base rate according to a repetition rate of the operated amount of the operation member.

34. The computer-readable recording medium according to claim 33, wherein the operation of the operating member includes alternate operation of at least two operating members.

* * * * *